US012763960B2

(12) United States Patent
Choi et al.

(10) Patent No.: US 12,763,960 B2
(45) Date of Patent: Oct. 13, 2026

(54) ELECTRONIC DEVICE AND METHOD FOR AUTHENTICATING A USER BASED ON BIOMETRIC INFORMATION

(71) Applicant: Samsung Electronics Co., Ltd., Suwon-si (KR)

(72) Inventors: Inmyung Choi, Suwon-si (KR); Minho Kim, Suwon-si (KR); Moonsoo Chang, Suwon-si (KR); Minsoo Shin, Suwon-si (KR); Sohyeon Jeon, Suwon-si (KR); Byoungil Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 174 days.

(21) Appl. No.: 18/598,325

(22) Filed: Mar. 7, 2024

(65) Prior Publication Data

US 2024/0405995 A1 Dec. 5, 2024

Related U.S. Application Data

(63) Continuation of application No. PCT/KR2024/001963, filed on Feb. 8, 2024.

(30) Foreign Application Priority Data

Jun. 1, 2023 (KR) ........................ 10-2023-0070728
Jul. 10, 2023 (KR) ........................ 10-2023-0089424

(51) Int. Cl.
*H04L 9/32* (2006.01)
*G06V 10/44* (2022.01)
*H04L 9/08* (2006.01)

(52) U.S. Cl.
CPC ............ *H04L 9/3231* (2013.01); *G06V 10/44* (2022.01); *H04L 9/0825* (2013.01); *H04L 9/3236* (2013.01)

(58) Field of Classification Search
CPC ... H04L 9/3231; H04L 9/0825; H04L 9/3236; H04L 9/0866; G06V 10/44
See application file for complete search history.

(56) References Cited

U.S. PATENT DOCUMENTS 9,275,270 B2 3/2016 Suwa et al.
10,404,465 B2 9/2019 Takahashi
(Continued)

FOREIGN PATENT DOCUMENTS

CN 113657322 A 11/2021
JP 6039942 B2 12/2016
(Continued)

OTHER PUBLICATIONS

International Search Report dated Jun. 3, 2024, issued in International Application No. PCT/KR2024/001963.

*Primary Examiner* — Hany S. Gadalla
(74) *Attorney, Agent, or Firm* — Jefferson IP Law, LLP

(57) ABSTRACT

An electronic device is provided. The electronic device includes memory storing instructions, a camera, a communication circuit, and a processor. The instructions, when executed by the processor, cause the electronic device to obtain an image including a body portion of a user through the camera based on execution of a software application, obtain a plurality of feature values for the body portion identified based on the image, generate a first value hashed based on first feature values representing at least one part of the body portion from among the plurality of feature values, generate a second value hashed based on second feature values representing at least another part of the body portion from among the plurality of feature values, and transmit, through the communication circuit, the first value and the second value to an external electronic device providing the software application.

18 Claims, 15 Drawing Sheets

(56) References Cited

U.S. PATENT DOCUMENTS

| | | | | |
|---|---|---|---|---|
| 11,582,041 | B2 | 2/2023 | Kim et al. | |
| 11,695,564 | B2 | 7/2023 | Choi et al. | |
| 11,831,766 | B2 | 11/2023 | Lee | |
| 2018/0019994 | A1 | 1/2018 | Chang et al. | |
| 2019/0138176 | A1 | 5/2019 | Heubel et al. | |
| 2021/0142034 | A1* | 5/2021 | Liao | G06V 40/1365 |
| 2022/0405369 | A1 | 12/2022 | Takahashi | |
| 2023/0164142 | A1* | 5/2023 | Okuyama | G06F 21/6254 726/7 |
| 2023/0246839 | A1* | 8/2023 | Mathieu | H04W 12/06 |

FOREIGN PATENT DOCUMENTS

| | | | |
|---|---|---|---|
| JP | 6238867 | B2 | 11/2017 |
| JP | 2018-050316 | A | 3/2018 |
| JP | 7060449 | B2 | 4/2022 |
| KR | 10-2018-0009275 | A | 1/2018 |
| KR | 10-2019-0017066 | A | 2/2019 |
| KR | 10-2020-0099290 | A | 8/2020 |
| KR | 10-2022-0064856 | A | 5/2022 |
| KR | 10-2022-0082061 | A | 6/2022 |
| KR | 10-2506815 | B1 | 3/2023 |

* cited by examiner

ELECTRONIC DEVICE AND METHOD FOR AUTHENTICATING A USER BASED ON BIOMETRIC INFORMATION

CROSS-REFERENCE TO RELATED APPLICATION(S)

This application is a continuation application, claiming priority under § 365 (c), of an International application No. PCT/KR2024/001963, filed on Feb. 8, 2024, which is based on and claims the benefit of a Korean patent application number 10-2023-0070728, filed on Jun. 1, 2023, in the Korean Intellectual Property Office, and of a Korean patent application number 10-2023-0089424, filed on Jul. 10, 2023, in the Korean Intellectual Property Office, the disclosure of each of which is incorporated by reference herein in its entirety.

TECHNICAL FIELD

The disclosure relates to an electronic device and method for authenticating a user based on biometric information.

BACKGROUND ART

An electronic device may provide a service to an authenticated user. For example, the user authentication may be performed using various methods. For example, the authentication may be performed based on biometric information.

The above information is presented as background information only to assist with an understanding of the disclosure. No determination has been made, and no assertion is made, as to whether any of the above might be applicable as a prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an electronic device and method for authenticating a user based on biometric information.

Additional aspects will be set forth in part in the description which follows and, in part, will be apparent from the description, or may be learned by practice of the presented embodiments.

In accordance with an aspect of the disclosure, an electronic device is provided. The electronic device may comprise memory, comprising one or more storage mediums, storing instructions. The electronic device may comprise a camera. The electronic device may comprise a communication circuit. The electronic device may comprise at least one processor comprising processing circuitry. The instructions, when executed by the at least one processor individually or collectively, may cause the electronic device to obtain an image including a body portion of a user through the camera based on execution of a software application. The instructions, when executed by the at least one processor individually or collectively, may cause the electronic device to obtain feature values for the body portion identified based on the image. The instructions, when executed by the at least one processor individually or collectively, may cause the electronic device to generate a first value hashed based on first feature values representing at least one part of the body portion from among the feature values. The instructions, when executed by the at least one processor individually or collectively, may cause the electronic device to generate a second value hashed based on second feature values representing at least another part of the body portion from among the feature values. The instructions, when executed by the at least one processor individually or collectively, may cause the electronic device to transmit, through the communication circuit, the first value and the second value to an external electronic device providing the software application.

In accordance with another aspect of the disclosure, a method performed by an electronic device is provided. The method may comprise obtaining an image including a body portion of a user through the camera based on execution of a software application. The method may comprise obtaining feature values for the body portion identified based on the image. The method may comprise generating a first value hashed based on first feature values representing at least one part of the body portion from among the feature values. The method may comprise generating a second value hashed based on second feature values representing at least another part of the body portion from among the feature values. The method may comprise transmitting, through the communication circuit, the first value and the second value to an external electronic device providing the software application.

In accordance with another aspect of the disclosure, a non-transitory computer-readable storage medium is provided. The non-transitory computer-readable storage medium, when individually or collectively executed by at least one processor of an electronic device comprising a camera and a communication circuit, may store one or more programs comprising instructions to cause to obtain an image including a body portion of a user through the camera based on execution of a software application. The non-transitory computer-readable storage medium, when individually or collectively executed by the at least one processor, may store one or more programs comprising instructions to cause to obtain feature values for the body portion identified based on the image. The non-transitory computer-readable storage medium, when individually or collectively executed by the at least one processor, may store one or more programs comprising instructions to cause to generate a first value hashed based on first feature values representing at least one part of the body portion from among the feature values. The non-transitory computer-readable storage medium, when individually or collectively executed by the at least one processor, may store one or more programs comprising instructions to cause to generate a second value hashed based on second feature values representing at least another part of the body portion from among the feature values. The non-transitory computer-readable storage medium, when individually or collectively executed by the at least one processor, may store one or more programs comprising instructions to cause to transmit, through the communication circuit, the first value and the second value to an external electronic device providing the software application.

In accordance with an aspect of the disclosure, an electronic device is provided. The electronic device may comprise memory, comprising one or more storage mediums, storing instructions. The electronic device may comprise a camera. The electronic device may comprise a communication circuit. The electronic device may comprise at least one processor comprising processing circuitry. The instructions, when executed by the at least one processor individually or collectively, may cause the electronic device to obtain biometric information for a body portion of a user through the sensor based on execution of a software application. The biometric information may include at least one of a finger print, a palm print, an iris, a voice, or an image for a face. The instructions, when executed by the at least one processor individually or collectively, may cause the electronic device to generate a first value hashed based on a portion of the biometric information and a second value hashed based on the biometric information. The first value may represent a password of the user for the software application. The second value may represent an identity (ID) for the software application. The instructions, when executed by the at least one processor individually or collectively, may cause the electronic device to transmit, to an external electronic device providing the software application through the communication circuit, the first value and the second value.

In accordance with an aspect of the disclosure, a method performed by an electronic device is provided. The method may comprise obtaining biometric information for a body portion of a user through the sensor based on execution of a software application. The biometric information may include at least one of a finger print, a palm print, an iris, a voice, or an image for a face. The method may comprise generating a first value hashed based on a portion of the biometric information and a second value hashed based on the biometric information. The first value may represent a password of the user for the software application. The second value may represent an identity (ID) for the software application. The method may comprise transmitting, to an external electronic device providing the software application through the communication circuit, the first value and the second value.

In accordance with another aspect of the disclosure, a non-transitory computer-readable storage medium is provided. The non-transitory computer-readable storage medium, when individually or collectively executed by at least one processor of an electronic device comprising a sensor and a communication circuit, may store one or more programs comprising instructions to cause to obtain biometric information for a body portion of a user through the sensor based on execution of a software application. The biometric information may include at least one of a finger print, a palm print, an iris, a voice, or an image for a face. The non-transitory computer-readable storage medium, when individually or collectively executed by the at least one processor, may store one or more programs comprising instructions to cause to generate a first value hashed based on a portion of the biometric information and a second value hashed based on the biometric information. The first value may represent a password of the user for the software application. The second value may represent an identity (ID) for the software application. The non-transitory computer-readable storage medium, when individually or collectively executed by the at least one processor, may store one or more programs comprising instructions to cause to transmit, to an external electronic device providing the software application through the communication circuit, the first value and the second value.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

Figure 1:
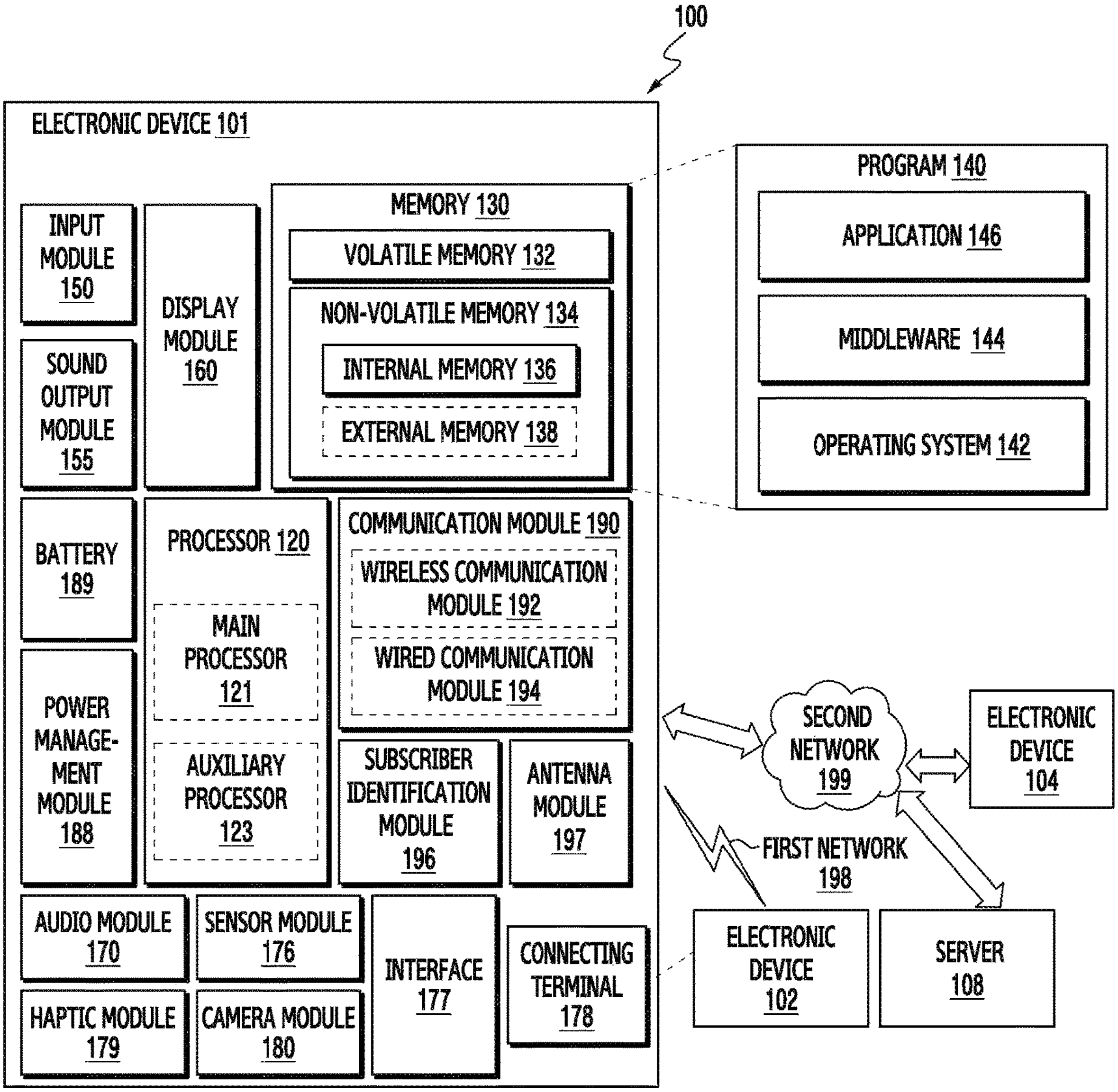
FIG. 1 is a block diagram of an electronic device in a network environment, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure are only used to describe a specific embodiment and may not be intended to limit the scope of other embodiments. The terms used herein, including technical or scientific terms, may have the same meaning as commonly understood by those having ordinary knowledge in the art which the disclosure describes. Among the terms used in the disclosure, terms defined in a general dictionary may be interpreted as having the same or similar meaning as those in the context of the related art and are not interpreted in an ideal or excessively formal meaning unless clearly defined in the disclosure. In some cases, even terms defined in the disclosure cannot be interpreted to exclude embodiments of the disclosure.

In various embodiments of the disclosure described below, a hardware access method will be described as an example. However, since various embodiments of the disclosure include art using both hardware and software, various embodiments of the disclosure do not exclude a software-based access method.

Terms referring to a configuration of a device (e.g., processor, display, camera, sensor, and the like), terms for an arithmetic state (e.g., step, operation, and procedure), terms referring to a signal (e.g., image, signal, information, data, and the like), and terms for referring to data (e.g., value and the like) used in the following description are illustrated for convenience of description. Accordingly, the disclosure is not limited to terms to be described below, and other terms having an equivalent technical meaning may be used.

In addition, in the disclosure, an expression of greater than or less than may be used to determine whether a specific condition is satisfied or fulfilled, but this is only a description for expressing an example and does not exclude description of greater than or equal to or less than or equal to. Conditions described as "greater than or equal to" may be replaced with "greater than", conditions described as "less than or equal to" may be replaced with "less than", and conditions described as "greater than or equal to and less than" may be replaced with "greater than and less than or equal to". In addition, hereinafter, 'A' to 'B' means at least one of the elements from A (including A) to B (including B).

It should be appreciated that the blocks in each flowchart and combinations of the flowcharts may be performed by one or more computer programs which include computer-executable instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module)

or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
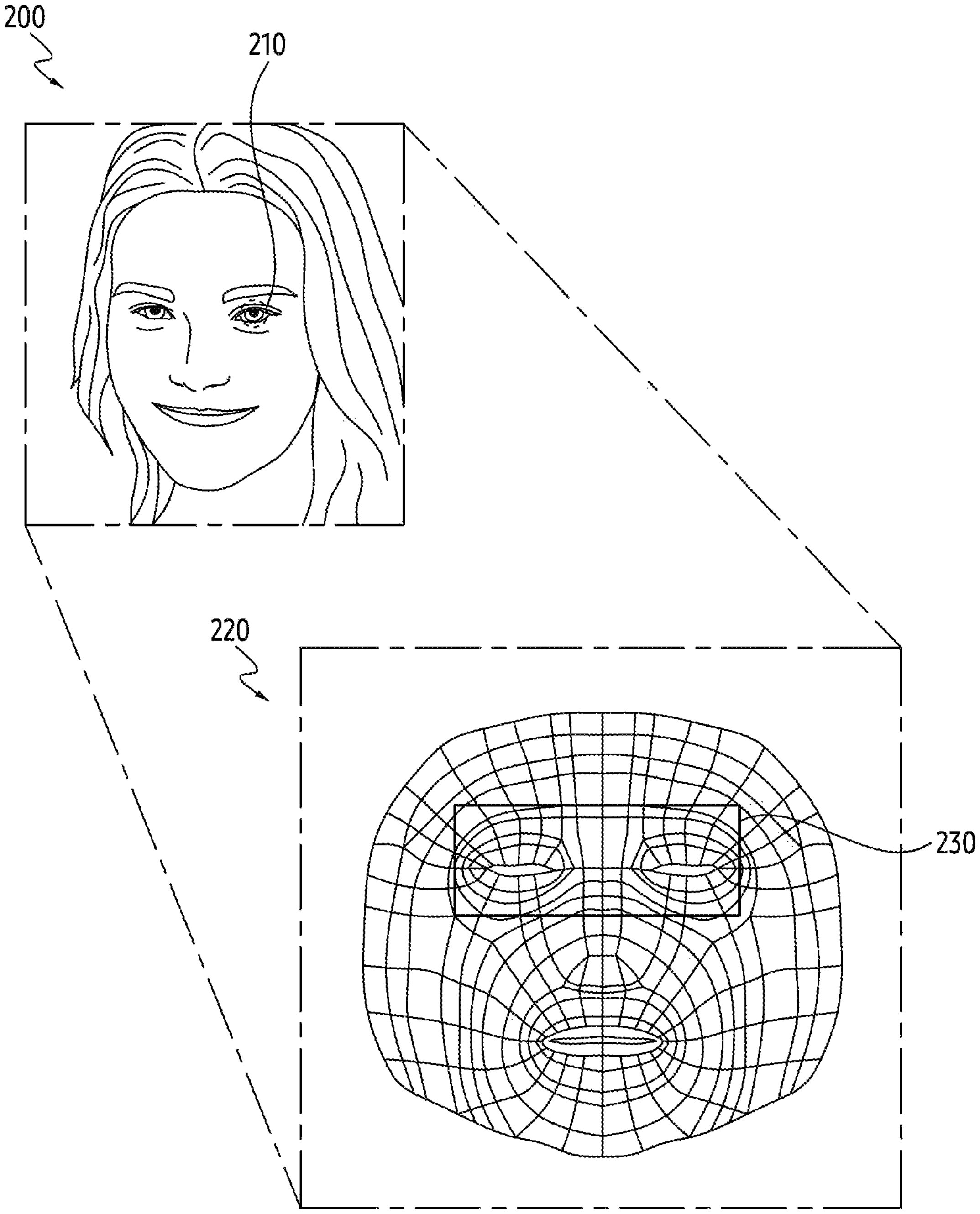
FIG. 2 illustrates biometric information according to an embodiment of the disclosure.

FIG. 2 illustrates biometric information according to an embodiment of the disclosure.

Referring to FIG. 2, examples for biometric information associated with a face 200 from among a user's body portion are illustrated. For example, the biometric information may include an iris 210 in association with an eye of the user's face 200. In addition, for example, the biometric information may include a whole 220 of the face 200 (or feature values for the whole face 220). In addition, for example, the biometric information may include periocular region 230 (or feature values for the periocular region 230), which is a portion of the face 200.

However, an embodiment of the disclosure is not limited to an example of FIG. 2. For example, the biometric information that may be applied to the embodiment of the disclosure may include a physical or behavioral characteristic according to a human for specifying and recognizing the human. Hereinafter, the human may be referred to as a user using an electronic device (e.g., the electronic device 101 of FIG. 1). For example, an operation of identifying a specific human based on the biometric information may be referred to as biometric authentication or biometric recognition. For example, the physical characteristic of the biometric information may include at least one of a fingerprint, a palm print, a palm shape, a face, periocular, an iris, a blood vessel (e.g., a vein), a retina (e.g., a pattern of capillaries within the retina), or an ear shape. For example, the behavioral characteristic of the biometric information may include at least one of voice, walk, or signature (or handwriting).

According to an embodiment of the disclosure, for an electronic device 101 to provide a specific service, user authentication may be required. For example, the electronic device 101 may provide the specific service to an authenticated user through a software application (e.g., the application 146 of FIG. 1). The user authentication may be performed through various methods.

For example, an authentication method in which the user directly inputs an identity (ID) for the user authentication and a password (PW) mapped to the identity may be used. The identity and the password for the authentication of the user may be referred to as user authentication information. For example, the user may generate the authentication information of the user for a specific software application. The user may enroll (or store) the identity and the password in the specific software application. The specific software application may be referred to as an external electronic device (e.g., the external electronic devices 102 and 104 of FIG. 1), a server (e.g., the server 108 of FIG. 1), a service, or a service provider. After the identity and the password are enrolled for the specific software application, the user may perform login by directly inputting the identity and the password for the specific software application. For example, the login may be referred to as performing the user authentication or verification.

In addition, for example, by storing the identity and the password for the user authentication in the electronic device 101 for each specific software application and performing the user authentication through the user's biometric information, an authentication method in which the identity and the password, which are the authentication information, are automatically inputted may be used. The automatically inputting may represent that the user does not directly input the identity and the password, but that the electronic device 101 identifies the identity and the password as being inputted in response to the authentication. For example, the user may enroll (or store) the identity and the password for the specific software application by directly inputting the identity and the password. After the identity and the password are enrolled, the identity and the password stored in the electronic device 101 may be automatically inputted by authenticating the user through the user's biometric information. The user may perform login for the specific software application by using the biometric information. In other words, the specific software application (or the external electronic device) may perform user authentication (or verification) by comparing the identity and the password inputted automatically with the identity and the password enrolled in the specific software application.

In addition, for example, an authentication method may be used that generates the authentication information using a public key generated based on the user's biometric information and performs verification of a signature based on the biometric information. The authentication method may be referred to as fast identity online (FIDO) or a passkey. For example, the specific software application (or the external electronic device) may request a public key for the electronic device 101 (or the user). The electronic device 101 may generate a pair of keys based on the user authentication. The user authentication for the pair of keys may include authentication based on biometric information and other information. For example, the user authentication for the pair of keys may include a one-time password (OTP). For example, the pair of keys may include the public key and a private key. The user's account may be generated by the electronic device 101 providing the public key to the specific software application. The account may represent a virtual information unit of the user for using the specific software application. After the account is generated, the electronic device 101 may request a login to the specific software application. Accordingly, the specific software application may request a signature from the electronic device 101. For example, the signature may be information generated based on the private key for the user. The signature may be information that may only be read (or accessed) through the public key. The signature may be information for confirming the user's identity. The electronic device 101 may generate the signature based on the private key and provide it to the specific software application. The specific software application may authenticate the user based on the signature. According to the authentication, the electronic device 101 may perform the login for the specific software application.

The authentication methods described above may perform authentication based on the user's identity and password or may perform authentication based on the user's biometric information. Authentication based on the identity and the password may cause inconvenience in that a user's direct input is required. In addition, authentication based on the user's biometric information has a problem of requiring a lot of cost in that a solution must be provided to perform authentication based on the biometric information in the specific software application.

Hereinafter, the electronic device and method according to an embodiment of the disclosure may generate a user's identity (ID) and password based on a hash value obtained based on biometric information. The method of obtaining the hash value based on the biometric information may be referred to as a biohash (or a biohash algorithm). In addition, the electronic device and method according to an embodiment of the disclosure may generate different identities and passwords for each service for the same biometric information by generating the user's identity and password based on the identification information of the specific software application. In addition, the electronic device and method according to an embodiment of the disclosure may map a designated identity (e.g., a designated string) that is easy for the user to use with respect to the identity which uses an arbitrarily hashed value. In addition, the electronic device and method according to an embodiment of the disclosure may always generate the same hash value based on the biometric information without storing a separate identity (ID) and password. Accordingly, the electronic device and method according to an embodiment of the disclosure may secure robust security. In addition, the electronic device and method according to an embodiment of the disclosure may be linked without a separate solution for applying biometric information with respect to an existing service, thereby enhancing usability.

Figure 3:
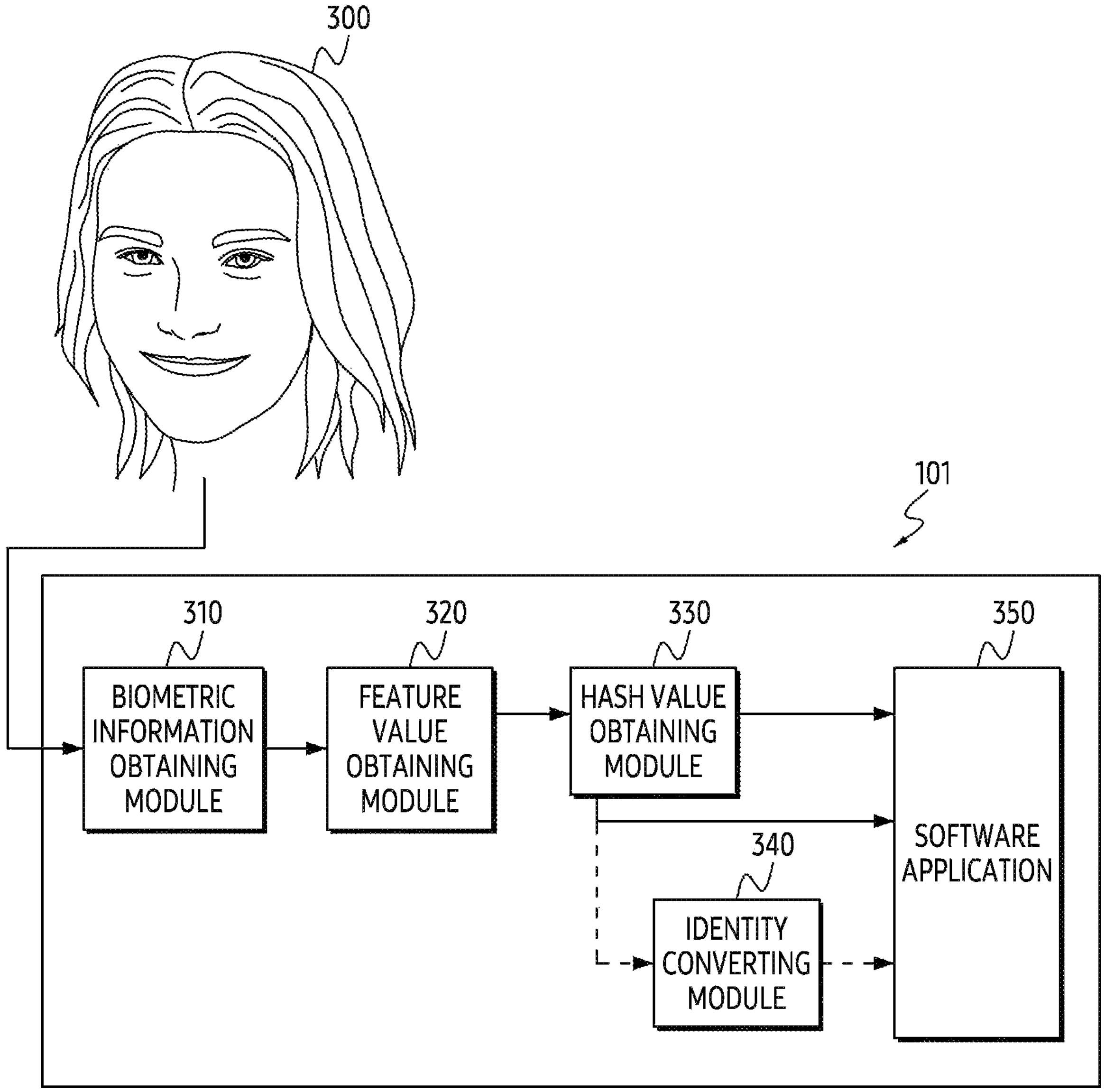
FIG. 3 illustrates a block diagram of an electronic device that authenticates a user based on biometric information according to an embodiment of the disclosure.

FIG. 3 illustrates a block diagram of an electronic device that authenticates a user based on biometric information according to an embodiment of the disclosure.

An electronic device 101 of FIG. 3 may include at least a part of an electronic device 101 of FIG. 1. For example, components of the electronic device 101 of FIG. 3 may be controlled by a processor 120 of the electronic device 101 of FIG. 1.

Referring to FIG. 3, the electronic device 101 may include components for generating identity (ID) and password (PW), which are authentication information for a specific software application of a user 300 based on biometric information. For example, the electronic device 101 may include a biometric information obtaining module 310, a feature value obtaining module 320, a hash value obtaining module 330, an identity converting module 340, and a software application 350. Each of the components included in the electronic device 101 may be implemented as hardware, software, or a combination of hardware and software. For example, a module may be implemented in a form of an algorithm.

An example of FIG. 3 is merely for convenience of description, and the configuration of the electronic device 101 according to an embodiment of the disclosure is not limited to the components of FIG. 3. For example, the electronic device 101 may further include or may less include components other than the components of FIG. 3. In other words, the electronic device 101 may include at least one component that performs substantially the same function as each function of the components of FIG. 3.

For example, the electronic device 101 may provide a service to the user 300 through the software application 350. The user 300 may be referred to as a person who uses the electronic device 101. In FIG. 3, one user 300 is illustrated, but an embodiment of the disclosure is not limited thereto. For example, the electronic device 101 may be used for a plurality of users. Generating an identity (ID) and a password (PW) for the software application 350 of the user 300 based on the biometric information may be performed for each of the plurality of users.

According to an embodiment of the disclosure, the electronic device 101 may obtain biometric information of the user 300. For example, the processor 120 may obtain the biometric information from outside through the biometric information obtaining module 310. For example, the biometric information obtaining module 310 may include a camera (e.g., the camera module 180 of FIG. 1) or a sensor (e.g., the sensor module 176 of FIG. 1). However, an embodiment of the disclosure is not limited thereto, and the biometric information obtaining module 310 may include a component capable of obtaining the biometric information from the outside. In addition, for example, the sensor may include an image sensor for obtaining an image, such as the camera.

For example, the processor 120 may obtain an image including a body portion of the user 300 based on the biometric information obtaining module 310. For example, the processor 120 may obtain the image including the body portion through the camera (or the sensor including the image sensor). For example, the image may include a visual object representing the body portion. In addition, the processor 120 may obtain data representing the biometric information of the user 300 based on the biometric information obtaining module 310. For example, the processor 120 may obtain the data representing the biometric information through the sensor. For example, the data may include information for identifying feature values according to a shape of the body portion. For example, the body portion may include a face or a hand of the user 300. For example, the body portion may include at least a part of the face or the hand. For example, the body portion may include an entire body of the user 300.

According to an embodiment of the disclosure, the electronic device 101 may obtain a plurality of feature values based on the biometric information of the user 300. For example, the processor 120 may obtain the plurality of feature values based on the biometric information through the feature value obtaining module 320. For example, the plurality of feature values obtained based on the biometric information may be associated with feature values for the body portion related to the biometric information. For example, the plurality of feature values may be obtained through a landmark obtained from the biometric information. For example, a landmark of the face may be obtained from the image including the face of the user 300. For example, the landmark may include two-dimensional (2D) coordinate or three-dimensional (3D) coordinate. The processor 120 may obtain at least a part of a set of feature values for each coordinate of the landmark as the plurality of feature values. In FIG. 3, the electronic device 101 illustrates one feature value obtaining module 320, but an embodiment of the disclosure is not limited thereto. For example, the electronic device 101 may include a plurality of feature value obtaining modules. In addition, in the above-described example, the feature values are described as an example of a feature value obtaining algorithm based on the landmark obtained from the biometric information, but an embodiment of the disclosure is not limited thereto. For example, the electronic device 101 may use various feature value extracting algorithms included in the feature value obtaining module 320.

According to an embodiment of the disclosure, the electronic device 101 may obtain a hash value based on the plurality of feature values. For example, the plurality of feature values may be a feature value for a body portion included in the biometric information. For example, the processor 120 may obtain the hash value based on at least some of the feature values from among the plurality of feature values through the hash value obtaining module 330. The at least some of the feature values may be a feature value representing at least a part of the body portion. For example, the processor 120 may generate the hash value by using the at least some of the feature value from among the plurality of feature values obtained from the biometric information. For example, the hash value may represent a hashed value (or data) based on the at least some of the feature value. For example, the processor 120 may generate a public key and a private key by using a biohash algorithm based on the at least some of the feature value. The biohash may include an algorithm for obtaining a hash value based on the biometric information. For example, the public key may be a vector for moving the at least some feature value to an arbitrary coordinate. For example, the private key may represent information on the arbitrary coordinate. In other words, the private key may be the vector indicating the arbitrary coordinate. Referring to the above description, the public key and the private key may be generated with respect to the body portion related to the at least some feature value. For example, in case that the body portion associated with the plurality of feature values is the face, and the body portion associated with the at least some of the feature value is periocular, the public key and the private key may be generated for the periocular. For example, the private key may be stored in memory (e.g., the memory 130 of FIG. 1) of the electronic device 101. For example, the public key may be enrolled (or stored) in an external electronic device (e.g., the server) related to an account. The external electronic device may be a server that manages the account of the user 300 for a manufacturer of the electronic device 101. For example, the public key may be stored for each of software application and biometric information (or associated body portion) in the server. The public key enrolled in the server may be used to generate another private key by using feature values for same biometric information. Accordingly, the electronic device 101 may identify whether the other private key generated corresponds to the private key stored in the electronic device 101. In case that the other private key and the private key correspond, the electronic device 101 may authenticate (or identify) that they are the same user. Specific details related to the biohash algorithm as described above will be described below in FIGS. 5A, 5B, 5C, 5D, and 6.

For example, the processor 120 may generate a first value hashed based on first feature values representing at least part of the body portion from among the plurality of feature values. For example, the first value may be the password (PW) of authentication information for the software application 350 of the user 300. In addition, the processor 120 may generate a second value hashed based on second feature values representing at least another part of the body portion from among the plurality of feature values. In the above-described example, the at least another part of the body portion may be included in the at least part of the body portion. Being included in the at least part of the body portion may represent that the at least another part of the body portion at least partially overlaps the at least part of the body portion. However, an embodiment of the disclosure is not limited thereto. For example, the at least another part of the body portion may be different from the at least part of the body portion. In other words, the at least another part of the body portion may not overlap at least partially with the at least part of the body portion. For example, the second value may be the identity (ID) of authentication information for the software application 350 of the user 300. For example, in a case of the body portion associated with the plurality of feature values is the face, the first feature values may be related to the periocular, and the second feature values may be related to an iris or the face. In addition, for example, in case that the body portion associated with the plurality of feature values is the hand, the first feature values may be related to a fingerprint, and the second feature values may be related to a palm print. However, an embodiment of the disclosure is not limited to the above-described examples. In addition, examples of the first value and the second value are described as authentication information for authenticating the user 300, but an embodiment of the disclosure is not limited thereto. For example, the authentication information for authenticating the user 300 may include three or more values. In this case, each of the three or more values may be generated by using at least part of the biometric information obtained through the biometric information obtaining module 310. In the above-described example, since the first value corresponds to the password (PW) of the authentication information and the second value corresponds to the identity (ID) of the authentication information, the first value may require a relatively high level of security. According to an embodiment of the disclosure, the first value may be generated based on biometric information with relatively higher security (e.g., the first feature values), and the second value may be generated based on biometric information with relatively lower security (e.g., the second feature values). Specific examples related to this will be described below in FIGS. 8A and 8B.

According to an embodiment of the disclosure, the electronic device 101 may convert the second value generated based on the biometric information into an identity in a form of a string designated by the user 300. For example, the processor 120 may convert the second value into the identity (or designated identity) having the designated string by using the identity converting module 340. For example, the designated identity having the designated string may be generated based on an input of the user 300. The designated string may represent a combination of words that are easy for the user 300 to use. For example, the designated string may include an e-mail of the user 300. For example, the processor 120 may use the second value as the identity as is, without converting the second value into the identity in the designated string form. In other words, the processor 120 may omit an identity converting operation using the identity converting module 340.

According to an embodiment of the disclosure, the electronic device 101 may transmit values generated based on the biometric information to an external electronic device. For example, the processor 120 may transmit the values for authentication of the user 300 to the external electronic device (e.g., the server) related to the software application 350. For example, the transmission may be performed based on a communication module 190 of FIG. 1. For example, the communication module 190 may be referred to as a communication circuit. For convenience of description, the external electronic device related to the software application 350 may be referred to as a first external electronic device. In the above-described example, the values may include the first value, which is the password, and the second value, which is the ID. The first value and the second value may be enrolled (or stored) in the external electronic device. The enrolled first value and the second value may be used for authentication (or login) of the user 300 by comparing them with the first value and the second value obtained for the same biometric information after enrollment. The comparison may be performed in the first external electronic device. For example, in case that the authentication is successful, the processor 120 may execute a designated function by using the software application 350. For example, in case that the authentication fails, the processor 120 may display a visual object for notifying that the authentication for the software application 350 has failed on a screen. For example, the screen may be included in a display (e.g., the display module 160 of FIG. 1) of the electronic device 101.

In the example described above, an example is illustrated in which the processor 120 obtains the image (or data) including the body portion based on the biometric information obtaining module 310, obtains the plurality of feature values from the obtained image (or data), and then identifies the first feature values and the second feature values, but an embodiment of the disclosure is not limited thereto. For example, after obtaining the image (or data), the processor 120 may identify a first image and a second image from the image. For example, the first image may represent an image for the at least part of the body portion. In addition, the second image may represent an image for the at least another part of the body portion. Alternatively, the second image may correspond to the image for the body portion. Thereafter, the processor 120 may generate the first feature values and the second feature values based on each of the first image and the second image through the feature value obtaining module 320. As described above, obtaining the first image and the second image may be performed based on at least one of the biometric information obtaining module 310, the feature value obtaining module 320, or another module (e.g., a biometric information processing module (not illustrated). In addition, for example, the processor 120 may obtain the image and another image. The processor 120 may generate the first feature values based on the image or may generate the second feature values based on the other image. In the above-described examples, obtaining the first feature values and the second feature values by the processor 120 may be performed based on a plurality of feature value obtaining modules or a plurality of feature value extracting algorithms in one feature value obtaining module 320.

FIG. 3 illustrates one software application 350 for convenience of description, but an embodiment of the disclosure is not limited thereto. For example, the electronic device 101 may store a plurality of software applications. For example, the plurality of software applications may be included in a program (e.g., the program 140 of FIG. 1) within memory (e.g., the memory 130 of FIG. 1). In addition, the software application 350 of FIG. 3 may represent an example of a component that provides a service to the user 300. In other words, the software application 350 may refer to a subject that provides the service to the user 300. For example, the software application 350 may be referred to as a web page that provides a specific service.

Referring to FIG. 3, the electronic device 101 may obtain biometric information of the user 300 and generate a plurality of values for authenticating the user 300 based on part and another part (or all) of the obtained biometric information. The plurality of values may be related to a specific software application (e.g., the software application 350) as authentication information of the user 300. In addition, each of the plurality of values may be related to the biometric information (or the associated body portion) of the user 300. For example, a value obtained based on the part of the biometric information may be enrolled (or stored) for the part of the biometric information (or the body portion associated with the part of the biometric information). In addition, for example, a value obtained based on the other part of the biometric information may be enrolled (or stored) for the other part of the biometric information (or the body portion associated with the other part of the biometric information). The electronic device 101 may secure convenience and security by authenticating the user 300 using the values. Hereinafter, a method of enrolling an account of the user 300 based on the values obtained from biometric information will be described in FIG. 4.

Figure 4:
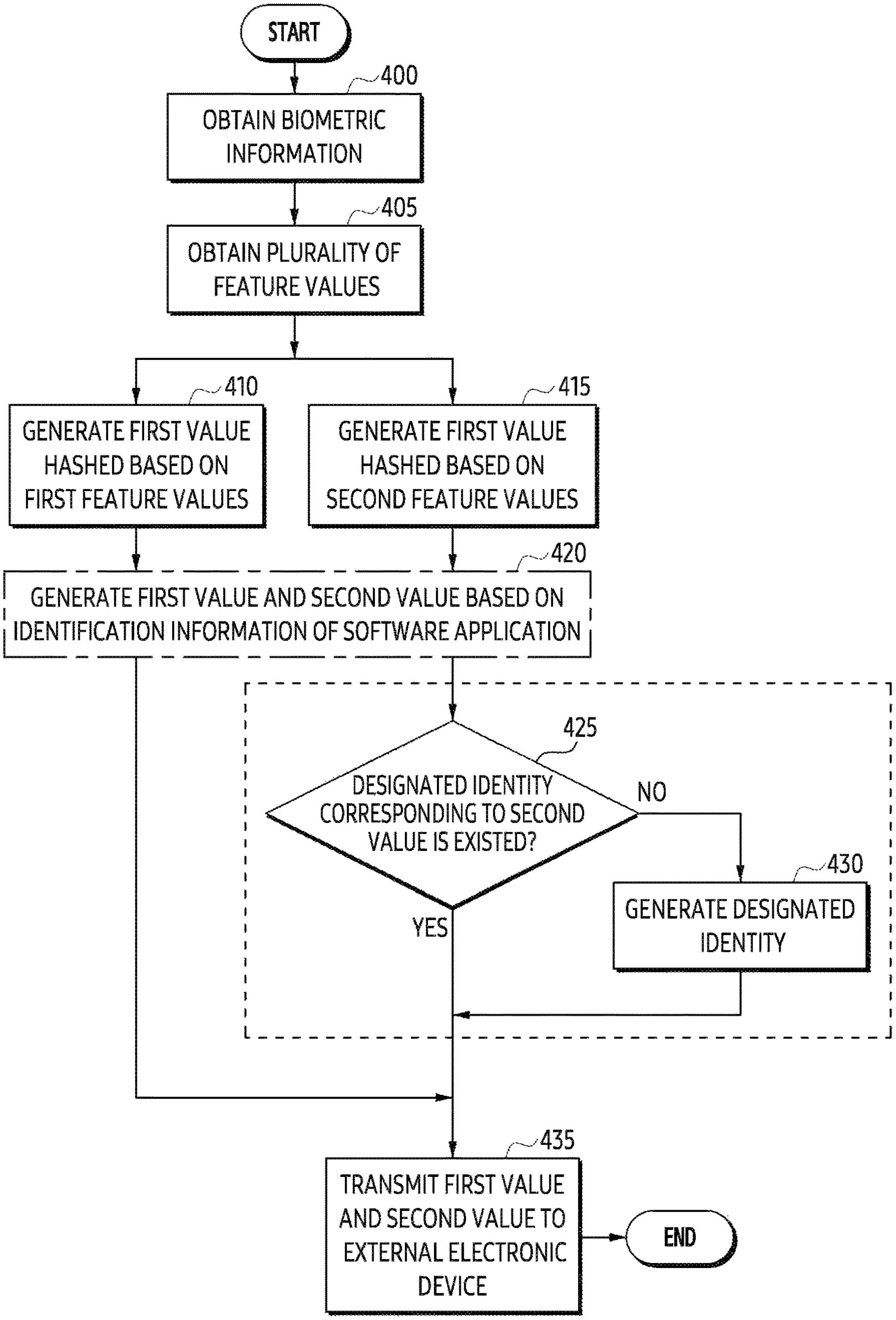
FIG. 4 illustrates an operation flow for a method of enrolling user authentication information based on biometric information with respect to a software application according to an embodiment of the disclosure.

FIG. 4 illustrates an operation flow for a method of enrolling user authentication information based on biometric information with respect to a software application according to an embodiment of the disclosure. The authentication information may represent user information authenticated using an identity (ID) and a password (PW) for the software application. The enrollment may be referred to as a service subscription for the software application.

Referring to FIG. 4, the method may be performed by an electronic device 101 of FIG. 3. For example, at least part of the method may be controlled by a processor (e.g., the processor 120 of FIG. 1) included in the electronic device 101.

Although not illustrated in FIG. 4, in an embodiment of the disclosure, the electronic device 101 may execute the software application. For example, the processor 120 may execute the software application based on an input to the software application.

In a following embodiment of the disclosure, each operation may be performed sequentially, but is not necessarily performed sequentially. For example, order of each operation may be changed, and at least two operations may be performed in parallel.

Referring to FIG. 4, in operation 400, the electronic device 101 may obtain biometric information. According to an embodiment of the disclosure, the electronic device 101 may obtain the biometric information for the user's body portion in a state in which the software application is executed. For example, in the state, the electronic device 101 may obtain an image including the user's body portion through a camera. For example, the image may include a visual object representing the body portion. For example, in the state, the electronic device 101 may obtain data including the user's body portion through a sensor. For example, the data may include information for identifying feature values according to a shape of the body portion. For example, in the state, the electronic device 101 may obtain the image through the camera and the data through the sensor together as the biometric information.

In operation 405, the electronic device 101 may obtain a plurality of feature values. According to an embodiment of the disclosure, the electronic device 101 may obtain the plurality of feature values for the body portion associated with the biometric information. For example, the electronic device 101 may obtain the plurality of feature values from the image or the data.

According to an embodiment of the disclosure, the electronic device 101 may identify first feature values from among the plurality of feature values. For example, the electronic device 101 may identify the first feature values representing at least part of the body portion from among the plurality of feature values. In addition, the electronic device 101 may identify second feature values from among the plurality of feature values. For example, the electronic device 101 may identify the second feature values representing at least another part of the body portion from among the plurality of feature values. For example, the at least part of the body portion related to the first feature values may include part or all of the body portion. In other words, the at least part of the body portion may be associated with part or all of the biometric information. For example, the at least another part of the body portion related to the second feature values may include part or all of the body portion. In other words, the at least another part of the body portion may be associated with part or all of the biometric information. In the above-described example, the at least another part of the body portion may be included in the at least part of the body portion. Being included in the at least part of the body portion may represent that the at least another part of the body portion at least partially overlaps the at least part of the body portion. However, an embodiment of the disclosure is not limited thereto. For example, the at least another part of the body portion may be different from the at least part of the body portion. In other words, the at least another part of the body portion may not overlap at least partially with the at least part of the body portion. For example, in a case that the body portion is a face, the at least part may be periocular, and the at least another part may be an iris or a retina. In addition, for example, in case that the body portion is the face, the at least part may be the iris, and the at least another part may be the face. In addition, for example, in case that the body portion is a hand, the at least part may be a fingerprint, and the at least another part may be a palm print or a palm shape.

In operation 410, the electronic device 101 may generate a first value hashed based on the first feature values. For example, the electronic device 101 may generate the first value by performing a biohash algorithm based on the first feature values from among the plurality of feature values. In addition, in operation 415, the electronic device 101 may generate a second value hashed based on the second feature values. For example, the electronic device 101 may generate the second value by performing the biohash algorithm based on the second feature values from among the plurality of feature values. The electronic device 101 may generate values (or authentication information) for user authentication by enrolling (or storing) a public key and a private key generated from on feature values based on the biohash algorithm and performing authentication based on the enrolled public key and private key. The values for user authentication may include the first value and the second value. For example, the first value may be used as a password (PW) for the software application. For example, the second value may be used as an identity (ID) for the software application. Specific details related to the biohash algorithm will be described below in FIGS. 5A, 5B, 5C, 5D, and 6.

In operation 420, the electronic device 101 may generate the first value and the second value based on identification information of the software application. For example, the electronic device 101 may generate the first value hashed based on the first feature values and the identification information. For example, the electronic device 101 may generate the second value hashed based on the second feature values and the identification information. For example, the identification information may include at least one of domain information of a first external electronic device (e.g., the server) for the software application or package information of the software application. For example, the package information may include a package name. The operation 420 may be partially performed or not performed. For example, the electronic device 101 may perform the operation 420 on the first value (e.g., the password) generated by the operation 410, and may not perform the operation 420 on the second value (e.g., the ID) generated by the operation 415. In addition, for example, the electronic device 101 may not perform the operation 420 on both the first value and the second value. In other words, the electronic device 101 may selectively perform the operation 420 according to a security degree. For example, the security degree may be set for each software application by the user.

In operation 425, the electronic device 101 may identify whether a designated identity corresponding to the second value exists. That the designated identity corresponds to the second value may represent that the designated identity is mapped to the second value. According to an embodiment of the disclosure, the electronic device 101 may identify whether the designated identity is enrolled (or stored) in an external electronic device (e.g., the server) related to an account or the electronic device 101. For example, the external electronic device related to the account may represent a server related to an account for a manufacturer of the electronic device 101. For convenience of description, the external electronic device related to the account may be referred to as a second external electronic device. The second external electronic device related to the account may represent an external electronic device (or a different server) that is different from the first external electronic device (or the server) for the software application.

According to an embodiment of the disclosure, the designated identity may represent an identity in a form of a designated string. For example, the designated string may represent a combination of words that make it easy for the user to use the account. For example, the designated string may include an e-mail of the user. For example, the designated string may be generated based on a user's input.

In operation 425, in case that the designated identity is stored in the external electronic device related to the account or the electronic device 101, the electronic device 101 may perform operation 435. For example, the electronic device 101 may use the designated identity instead of the second value as an identity (ID) to be enrolled for the software application. In the operation 425, in case that the designated identity is not stored in the second external electronic device or the electronic device 101, the electronic device 101 may perform operation 430.

In the operation 430, the electronic device 101 may generate the designated identity. According to an embodiment of the disclosure, the electronic device 101 may store (or enroll) the designated identity to be mapped to the second value in the second external electronic device or the electronic device 101. For example, the electronic device 101 may obtain the designated identity based at least in part on the user's input. The electronic device 101 may store the designated identity in the second external electronic device or the electronic device 101. However, the operation 430 may not be performed. For example, the electronic device 101 may use the second value, which is a hash value, as an identity (ID) to be used for the user authentication of the software application.

Referring to the above description, the electronic device 101 may or may not partially perform the operations 425 to 430. For example, as described above, in case that the designated identity mapped to the second value does not exist in the second external electronic device or the electronic device 101, the electronic device 101 may omit performing the operation 430 and may use the second value as an identity (ID) to be used for the authentication. In addition, for example, as described in the operation 420, the electronic device 101 may omit identifying whether the designated identity exists and may use the second value as the identity (ID) to be used for the authentication. In other words, the electronic device 101 may selectively perform the operations 425 to 430 according to a setting of the software application or a global setting. For example, the electronic device 101 may set whether to use a preferred ID in a process of generating the identity (ID) based on biometric information on the setting of the software application. In case that the preferred ID is used, the electronic device 101 may perform at least part of the operations 425 to 430. For example, in case that the preferred ID is not used, the electronic device 101 may not perform the operations 425 to 430. In addition, for example, the electronic device 101 may set whether to use the preferred ID based on the biometric information on the global setting.

In the operation 435, the electronic device 101 may transmit the first value and the second value to an external electronic device. For example, the transmission may be performed based on the communication module 190 of FIG. 1. For example, the communication module 190 may be referred to as a communication circuit. The external electronic device may represent the first external electronic device for the software application. According to an embodiment of the disclosure, the electronic device 101 may transmit the first value and the second value to the first external electronic device to enroll (or store) the first value and the second value in the first external electronic device. Each of the first value and the second value may be enrolled (or stored) with respect to associated biometric information (or the associated body portion) in the first external electronic device. For example, in case that the first value is generated from the first feature values for the iris, the first value may be enrolled (or stored) in the first external electronic device for the iris. In addition, for example, in case that the second value is generated from the second feature values for the face, the second value may be enrolled (or stored) in the first external electronic device for the face. The enrolled first value and the second value may be used for the user authentication.

Referring to the above, it is illustrated as an example that the electronic device 101 obtains one biometric information, but an embodiment of the disclosure is not limited thereto. For example, the electronic device 101 may obtain first biometric information (e.g., image) through the camera and second biometric information (e.g., data) through the sensor in a state that the software application is running. For example, the first biometric information may be used to generate the first value. For example, the second biometric information may be used to generate the second value.

Hereinafter, in FIG. 5A, an example for a method of enrolling a value hashed based on the biometric information through the biohash algorithm will be described.

Figure 5A:
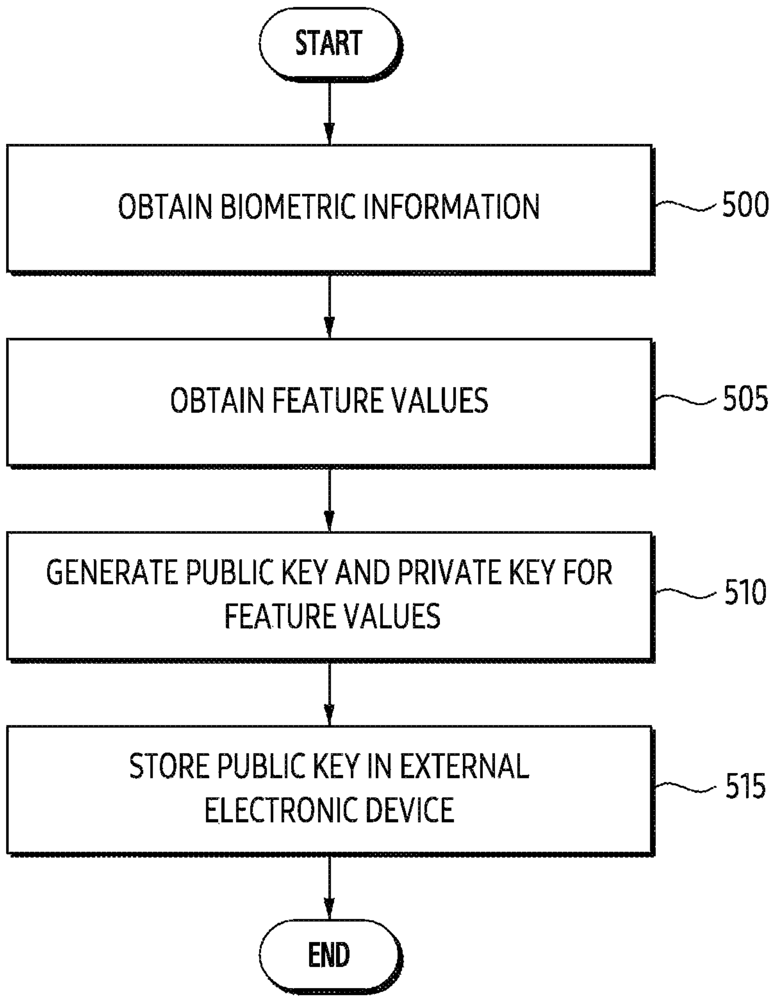
FIG. 5A illustrates an operation flow for a method of enrolling a value hashed based on biometric information according to an embodiment of the disclosure.

FIG. 5A illustrates an operation flow for a method of enrolling a value hashed based on biometric information according to an embodiment of the disclosure.

Referring to FIG. 5A, the method may be performed by an electronic device 101 of FIG. 3. For example, at least part of the method may be controlled by a processor (e.g., the processor 120 of FIG. 1) included in the electronic device 101.

In a following embodiment of the disclosure, each operation may be performed sequentially, but is not necessarily performed sequentially. For example, order of each operation may be changed, and at least two operations may be performed in parallel.

Referring to FIG. 5A, in operation 500, the electronic device 101 may obtain biometric information. According to an embodiment of the disclosure, the electronic device 101 may obtain the biometric information on the user's body portion. For example, in the above state, the electronic device 101 may obtain an image including the user's body portion through a camera. For example, the image may include a visual object representing the body portion. For example, the electronic device 101 may obtain data including the user's body portion through a sensor. For example, the data may include information for identifying feature values according to a shape of the body portion. For example, in the above state, the electronic device 101 may obtain the image through the camera and the data through the sensor together as the biometric information.

In operation 505, the electronic device 101 may obtain a plurality of feature values. According to an embodiment of the disclosure, the electronic device 101 may obtain the plurality of feature values for the body portion associated with the biometric information. For example, the electronic device 101 may obtain the plurality of feature values from the image or the data.

According to an embodiment of the disclosure, the electronic device 101 may identify first feature values from among the plurality of feature values. For example, the electronic device 101 may identify the first feature values representing at least part of the body portion from among the plurality of feature values. In addition, the electronic device 101 may identify second feature values from among the plurality of feature values. For example, the electronic device 101 may identify the second feature values representing at least another part of the body portion from among the plurality of feature values. For example, the at least part of the body portion related to the first feature values may include part or all of the body portion. In other words, the at least part of the body portion may be associated with part or all of the biometric information. For example, the at least another part of the body portion related to the second feature values may include part or all of the body portion. In other words, the at least another part of the body portion may be associated with part or all of the biometric information. For example, in a case that the body portion is a face, the at least part may be periocular, and the at least another part may be an iris or a retina. In addition, for example, in case that the body portion is the face, the at least part may be the iris, and the at least another part may be the face. In addition, for example, in case that the body portion is a hand, the at least part may be a fingerprint, and the at least another part may be a palm print or a palm shape.

In operation 510, the electronic device 101 may generate a public key and a private key for the feature values. According to an embodiment of the disclosure, the electronic device 101 may generate the public key and the private key by performing a biohash algorithm based on the feature values. For example, the biohash algorithm may include identifying arbitrary coordinate for each of the feature values and identifying a mapped (or hashed) value for the identified coordinate. For example, the biohash algorithm may be performed based on a hash value obtaining module 330 of FIG. 3.

Referring to the above-described example, the electronic device 101 may generate a first public key and a first private key for the first feature values. For example, the first public key may be a vector for moving the first feature values to first coordinates. For example, the first private key may be a vector indicating the first coordinates. The vector indicating the first coordinates may be referred to as information on the first coordinates. In addition, for example, the electronic device 101 may generate a second public key and a second private key for the second feature values. For example, the second public key may be a vector for moving the second feature values to second coordinates. For example, the second private key may be a vector indicating the second coordinates. The vector indicating the second coordinates may be referred to as information on the second coordinates. For example, each of the first coordinates and the second coordinates may be referred to as arbitrary coordinates where a specific position is not designated.

In operation 515, the electronic device 101 may store the public key in an external electronic device. For example, the external electronic device may be referred to as a second external electronic device related to the user's account for a manufacturer of the electronic device 101. For example, the electronic device 101 may store (or enroll) the public key in the second external electronic device in a state linked to the user's account for the electronic device 101. However, an embodiment of the disclosure is not limited thereto. For example, the electronic device 101 may store (or enroll) a value hashed based on the private key in the second external electronic device in a state linked to the user's account for the electronic device 101. In addition, for example, the electronic device 101 may store the public key (or the public key and the value) in the second external electronic device in a state linked to the body portion related to the feature values used to generate the public key. The user's account for the electronic device 101 may represent the user's account for the manufacturer of the electronic device 101. In other words, the user's account for the electronic device 101 may be distinct from the user's account for a specific software application. For example, the electronic device 101 may store the first value hashed based on the first private key and the first public key in the second external electronic device. In addition, the electronic device 101 may store the second value hashed based on the second private key and the second public key in the second external electronic device. In the above-described example illustrates as the electronic device 101 stores the first value, the first public key, the second value, and the second public key in the second external electronic device, but an embodiment of the disclosure is not limited thereto. According to an embodiment of the disclosure, the electronic device 101 may store the public key (or the public key and the value) in the electronic device 101 in a state linked to the body portion related to the feature values used to generate the public key (or the public key and the value).

The first value may represent data in which the first private key indicating the first coordinates converted from the first feature values is hashed. The second value may represent data in which the second private key indicating the second coordinates converted from the second feature values is hashed.

Although not illustrated in FIG. 5A, according to an embodiment of the disclosure, the electronic device 101 may store the first private key and the second private key in the electronic device 101. For example, each of the first private key and the second private key may be stored in a state linked to specific biometric information (or body portion).

As described above, the method of FIG. 5A may be performed before the operation 400 of FIG. 4 is performed. However, an embodiment of the disclosure is not limited thereto. For example, in the operations 405 to 415 of FIG. 4, the public key (or the public key and the value) may be enrolled (or stored) in the second external electronic device according to FIG. 5A. After enrollment, in the operations 405 to 415 of FIG. 4, the authentication may be performed based on the enrolled public key of FIG. 5B. According to the authentication of FIG. 5B, the first value and the second value, which are authentication information, may be generated. Specific details for the method of performing the authentication based on the enrolled public key will be described in FIG. 5B below. Alternatively, after enrollment, in the operations 405 to 415 of FIG. 4, the authentication may be performed based on the enrolled public key and the value of FIG. 5C. According to the authentication of FIG. 5C, the first value and the second value, which are authentication information, may be generated. Specific details for the method of performing the authentication based on the enrolled public key and the value will be described in FIG. 5C below.

Figure 5B:
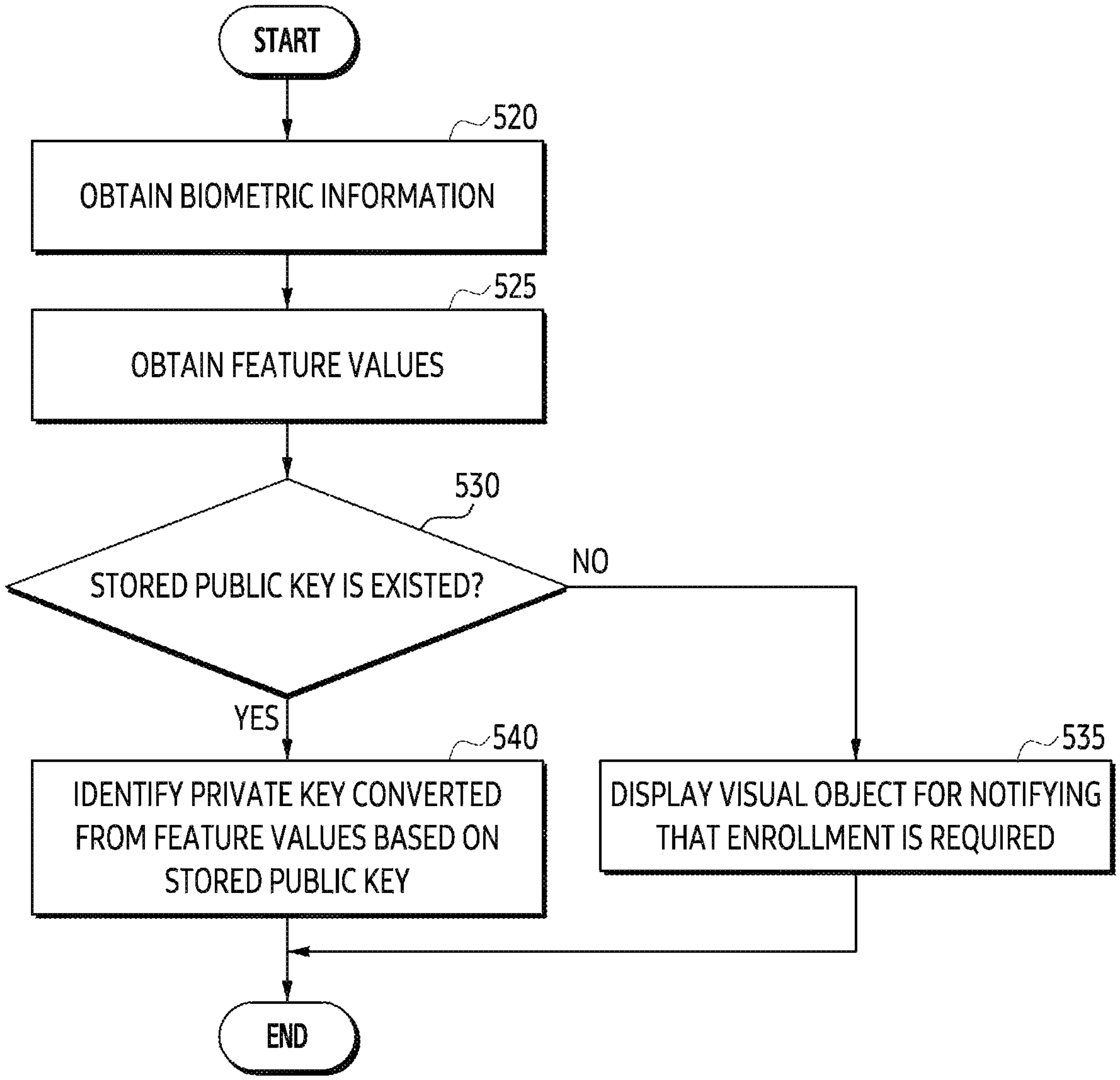
FIG. 5B illustrates an operation flow for a method of authenticating a value hashed based on biometric information according to an embodiment of the disclosure.

FIG. 5B illustrates an operation flow for a method of authenticating a value hashed based on biometric information according to an embodiment of the disclosure.

Referring to FIG. 5B, the method may be performed by an electronic device 101 of FIG. 3. For example, at least part of the method may be controlled by a processor (e.g., the processor 120 of FIG. 1) included in the electronic device 101. The method of FIG. 5B may be a specific example for the operation 400 to the operation 410 (or operation 415) of FIG. 4.

Although not illustrated in FIG. 5B, in an embodiment of the disclosure, the electronic device 101 may execute the software application. For example, the electronic device 101 may execute the software application based on an input to the software application.

In a following embodiment of the disclosure, each operation may be performed sequentially, but is not necessarily performed sequentially. For example, order of each operation may be changed, and at least two operations may be performed in parallel.

Referring to FIG. 5B, in operation 520, the electronic device 101 may obtain biometric information. According to an embodiment of the disclosure, the electronic device 101 may obtain the biometric information for the user's body portion in a state in which the software application is executed. For example, in the above state, the electronic device 101 may obtain an image including the user's body portion through a camera. For example, the image may include a visual object representing the body portion. For example, in the above state, the electronic device 101 may obtain data including the user's body portion through a sensor. For example, the data may include information for identifying feature values according to a shape of the body portion. For example, in the above state, the electronic device 101 may obtain the image through the camera and the data through the sensor together as the biometric information.

In operation 525, the electronic device 101 may obtain a plurality of feature values. According to an embodiment of the disclosure, the electronic device 101 may obtain the plurality of feature values for the body portion associated with the biometric information. For example, the electronic device 101 may obtain the plurality of feature values from the image or the data.

According to an embodiment of the disclosure, the electronic device 101 may identify first feature values from among the plurality of feature values. For example, the electronic device 101 may identify the first feature values representing at least part of the body portion from among the plurality of feature values. In addition, the electronic device 101 may identify second feature values from among the plurality of feature values. For example, the electronic device 101 may identify the second feature values representing at least another part of the body portion from among the plurality of feature values. For example, the at least part of the body portion related to the first feature values may include part or all of the body portion. In other words, the at least part of the body portion may be associated with part or all of the biometric information. For example, the at least another part of the body portion related to the second feature values may include part or all of the body portion. In other words, the at least another part of the body portion may be associated with part or all of the biometric information. For example, in case that the body portion is a face, the at least part may be periocular, and the at least another part may be an iris or a retina. In addition, for example, in case that the body portion is the face, the at least part may be the iris, and the at least another part may be the face. In addition, for example, in a case that the body portion is a hand, the at least part may be a fingerprint, and the at least another part may be a palm print or a palm shape.

In operation 530, the electronic device 101 may identify whether a stored public key exists. For example, the electronic device 101 may identify whether the stored public key exists. The public key may represent a value stored in the operation 515. According to an embodiment of the disclosure, the electronic device 101 may identify whether the stored public key exists based on the user's account for the electronic device 101. For example, the user's account for the electronic device 101 may represent the user's account for a manufacturer of the electronic device 101. For example, the stored public key may be stored for each biometric information (or body portion) in a state linked to the account. The electronic device 101 may identify whether the public key is stored in the second external electronic device with respect to biometric information corresponding to at least part of the plurality of feature values (e.g., the first feature values or the second feature values) obtained in the operation 525. In the operation 530, in a case that the public key is stored in the second external electronic device, the electronic device 101 may perform operation 540. Alternatively, in the operation 530, in case that the public key is not stored in the second external electronic device, the electronic device 101 may perform operation 535.

In the operation 535, the electronic device 101 may display a visual object for notifying that enrollment is required. According to an embodiment of the disclosure, the electronic device 101 may display the visual object on a screen in response to identifying that there is no public key which is stored for the biometric information and is linked to the user's account for the electronic device 101. For example, the screen may be included in a display (e.g., the display module 160 of FIG. 1) of the electronic device 101.

In the operation 540, the electronic device 101 may identify a private key converted from the feature values based on the stored public key. For example, the electronic device 101 may identify the first public key stored in the second external electronic device with respect to the first feature values from among the plurality of feature values. For example, the electronic device 101 may generate a third private key converted from the first feature values based on the stored first public key. The first feature values may be feature values obtained based on biometric information obtained in the operation 520. The stored first public key may be generated based on first feature values obtained based on biometric information obtained in operation 500 of FIG. 5A. The first feature values for generating the stored first public key are linked to a same body portion (or biometric information) as the first feature values for generating the third private key, but may represent different feature values.

Although FIG. 5B has been described based on an example of a first value generated with respect to the first feature values for convenience of description, an embodiment of the disclosure is not limited thereto. For example, the above-described operations on the first value may be performed to generate a second value based on the second feature values.

Figure 5C:
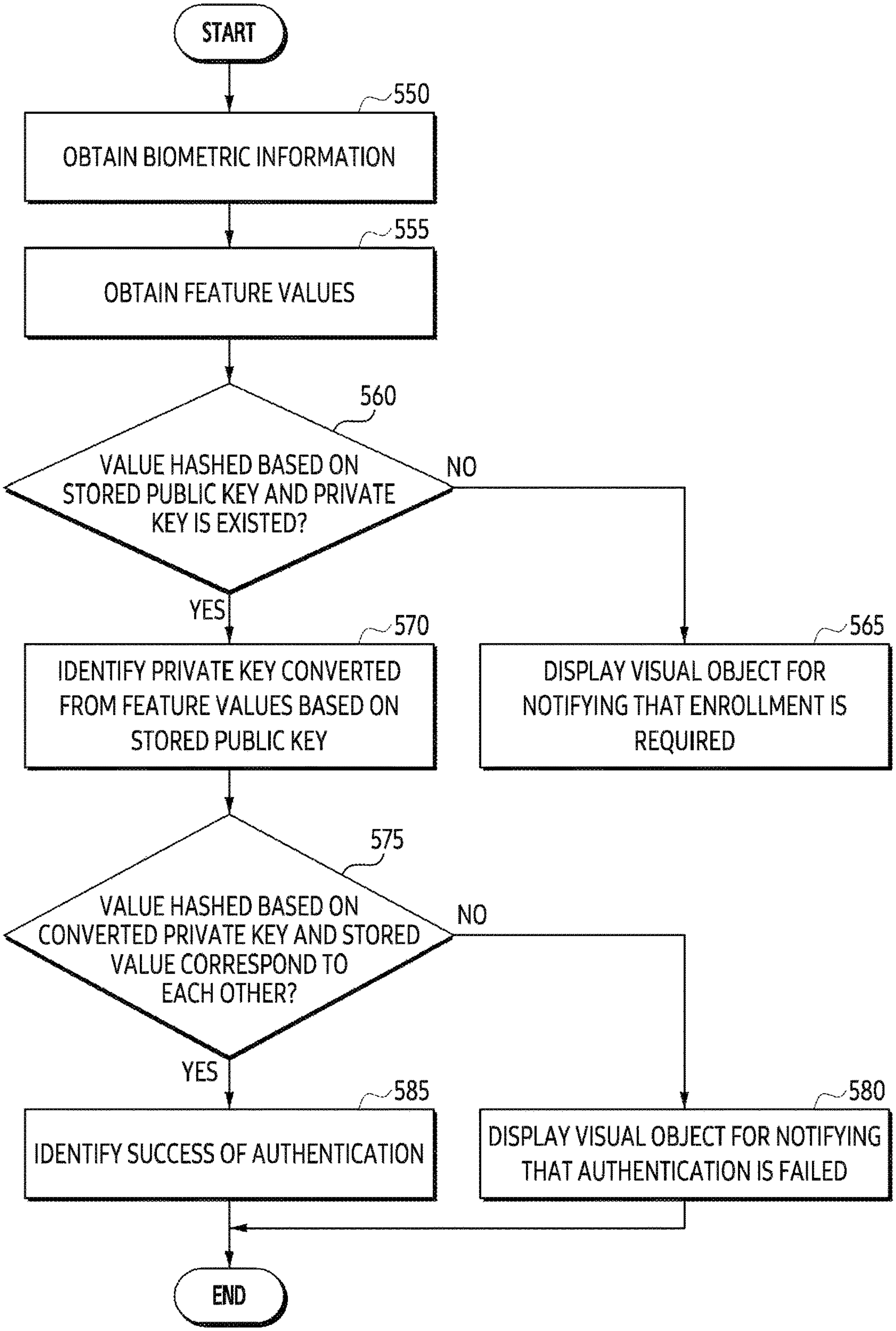
FIG. 5C illustrates an example of an operation flow for a method of authenticating a value hashed based on biometric information according to an embodiment of the disclosure.

FIG. 5C illustrates an operation flow for a method of authenticating a value hashed based on biometric information according to an embodiment of the disclosure.

Referring to FIG. 5C, the method may be performed by an electronic device 101 of FIG. 3. For example, at least part of the method may be controlled by a processor (e.g., the processor 120 of FIG. 1) included in the electronic device 101. The method of FIG. 5C may be a specific example of operations 400 to 410 (or operation 415) of FIG. 4.

Although not illustrated in FIG. 5C, in an embodiment of the disclosure, the electronic device 101 may execute the software application. For example, the electronic device 101 may execute the software application based on an input to the software application.

In a following embodiment of the disclosure, each operation may be performed sequentially, but is not necessarily performed sequentially. For example, order of each operation may be changed, and at least two operations may be performed in parallel.

Referring to FIG. 5C, in operation 550, the electronic device 101 may obtain biometric information. According to an embodiment of the disclosure, the electronic device 101 may obtain the biometric information for the user's body portion in a state in which the software application is executed. For example, in the above state, the electronic device 101 may obtain an image including the user's body portion through a camera. For example, the image may include a visual object representing the body portion. For example, in the above state, the electronic device 101 may obtain data including the user's body portion through a sensor. For example, the data may include information for identifying feature values according to a shape of the body portion. For example, in the above state, the electronic device 101 may obtain the image through the camera and the data through the sensor together as the biometric information.

In operation 555, the electronic device 101 may obtain a plurality of feature values. According to an embodiment of the disclosure, the electronic device 101 may obtain the plurality of feature values for the body portion associated with the biometric information. For example, the electronic device 101 may obtain the plurality of feature values from the image or the data.

According to an embodiment of the disclosure, the electronic device 101 may identify first feature values from among the plurality of feature values. For example, the electronic device 101 may identify the first feature values representing at least part of the body portion from among the plurality of feature values. In addition, the electronic device 101 may identify second feature values from among the plurality of feature values. For example, the electronic device 101 may identify the second feature values representing at least another part of the body portion from among the plurality of feature values. For example, the at least part of the body portion related to the first feature values may include part or all of the body portion. In other words, the at least part of the body portion may be associated with part or all of the biometric information. For example, the at least another part of the body portion related to the second feature values may include part or all of the body portion. In other words, the at least another part of the body portion may be associated with part or all of the biometric information. For example, in case that the body portion is a face, the at least part may be periocular, and the at least another part may be an iris or a retina. In addition, for example, in case that the body portion is the face, the at least part may be the iris, and the at least another part may be the face. In addition, for example, in a case that the body portion is a hand, the at least part may be a fingerprint, and the at least another part may be a palm print or a palm shape.

In operation 560, the electronic device 101 may identify whether a value hashed based on a stored public key and private key exists. For example, the electronic device 101 may identify whether the stored public key exists. In addition, the electronic device 101 may identify whether a value hashed based on the stored private key exists. The value hashed based on the public key and the private key may represent a value stored in operation 515. According to an embodiment of the disclosure, the electronic device 101 may identify whether a value hashed based on the stored public key and private key based on the user's account for the electronic device 101 exists. For example, the user's account for the electronic device 101 may represent the user's account for a manufacturer of the electronic device 101. For example, the value hashed based on the stored public key and private key may be stored for each biometric information (or body portion) as a state linked to the account. The electronic device 101 may identify whether the public key and the hashed value for biometric information corresponding to at least part of the plurality of feature values (e.g., the first feature values or the second feature values) obtained in the operation 555 are stored in the second external electronic device. In the operation 560, in case that the public key and the hashed value are stored in the second external electronic device, the electronic device 101 may perform operation 570. Alternatively, in the operation 560, in case that the public key and the hashed value are not stored in the second external electronic device, the electronic device 101 may perform operation 565.

In the operation 565, the electronic device 101 may display a visual object for notifying that enrollment is required. According to an embodiment of the disclosure, the electronic device 101 may display the visual object on the screen in response to identifying that a value hashed based on the public key and private key linked to the user's account for the electronic device 101 and stored for the biometric information does not exist. For example, the screen may be included in a display (e.g., the display module 160 of FIG. 1) of the electronic device 101.

In operation 570, the electronic device 101 may identify a private key converted from the feature values based on the stored public key. For example, the electronic device 101 may identify the first public key stored in the second external electronic device for the first feature values from among the plurality of feature values. For example, the electronic device 101 may generate a third private key converted from the first feature values based on the stored first public key. The first feature values may be feature values obtained based on biometric information obtained in operation 520. The stored first public key may be generated based on first feature values obtained based on biometric information obtained in operation 500 of FIG. 5A. The first feature values for generating the stored first public key are linked to a same body portion (or biometric information) as the first feature values for generating the third private key, but may represent different feature values.

In operation 575, the electronic device 101 may identify whether the value hashed based on the converted private key and the stored value correspond to each other. The stored value may represent the value hashed based on the private key identified in the operation 560. For example, the electronic device 101 may identify whether the value hashed based on the third private key and the value hashed based on the first private key correspond to each other. The value hashed based on the first private key may represent the value stored in the operation 515 by being hashed based on the first private key generated in operation 510 of FIG. 5A. According to an embodiment of the disclosure, the electronic device 101 may identify whether a difference between the value hashed based on the third private key and the value hashed based on the first private key is less than or equal to a reference value. For example, in case that the difference is less than or equal to the reference value, the electronic device 101 may identify that the value hashed based on the third private key and the value hashed based on the first private key correspond to each other. In the operation 575, it is described as an example of identifying whether the value hashed based on the third private key and the value hashed based on the first private key correspond, but an embodiment of the disclosure is not limited thereto. For example, the electronic device 101 may identify whether the third private key and the first private key correspond.

In the operation 575, in case that the value hashed based on the third private key and the value hashed based on the first private key correspond to each other, the electronic device 101 may perform operation 585. In contrast, in case that the value hashed based on the third private key and the value hashed based on the first private key are different, the electronic device 101 may perform operation 580.

In the operation 580, the electronic device 101 may display a visual object for notifying that authentication has failed. For example, in case that the value hashed based on the third private key and the value hashed based on the first private key are different, the electronic device 101 may identify that the authentication has failed. The authentication may be understood as substantially the same as verifying that the same data is generated by biometric information (e.g., the biometric information obtained in the operation 500 of FIG. 5A) for the user's specific body portion and other biometric information (e.g., the biometric information obtained in the operation 550 of FIG. 5C) for the specific body portion. According to an embodiment of the disclosure, the electronic device 101 may display the visual object on the screen in response to identifying that the authentication has failed. For example, the screen may be included in a display (e.g., the display module 160 of FIG. 1) of the electronic device 101.

In the operation 585, the electronic device 101 may identify success of authentication. According to an embodiment of the disclosure, the electronic device 101 may identify the success based on identifying that the value hashed based on the converted private key in the operation 570 corresponds to the value hashed based on the private key stored in the operation 515. Accordingly, the electronic device 101 may use the value hashed based on the converted private key to perform login.

According to an embodiment of the disclosure, based on identifying the authentication success, each of the values generated in operation 410 or operation 415 of FIG. 4 may be identified as the value hashed based on the converted private key. In the above-described example, the electronic device 101 may generate a first value hashed based on the third private key. The first value hashed based on the third private key may represent data hashed with respect to the first feature values obtained in the operation 555 and generated based on the operation 570. The first value hashed based on the third private key may represent an example of values generated in the operation 410 or the operation 415 of FIG. 4.

Although FIG. 5C is described based on an example of the first value generated for the first feature values for convenience of description, an embodiment of the disclosure is not limited thereto. For example, the above-described operations for the first value may be performed to generate a second value based on the second feature values.

Figure 5D:
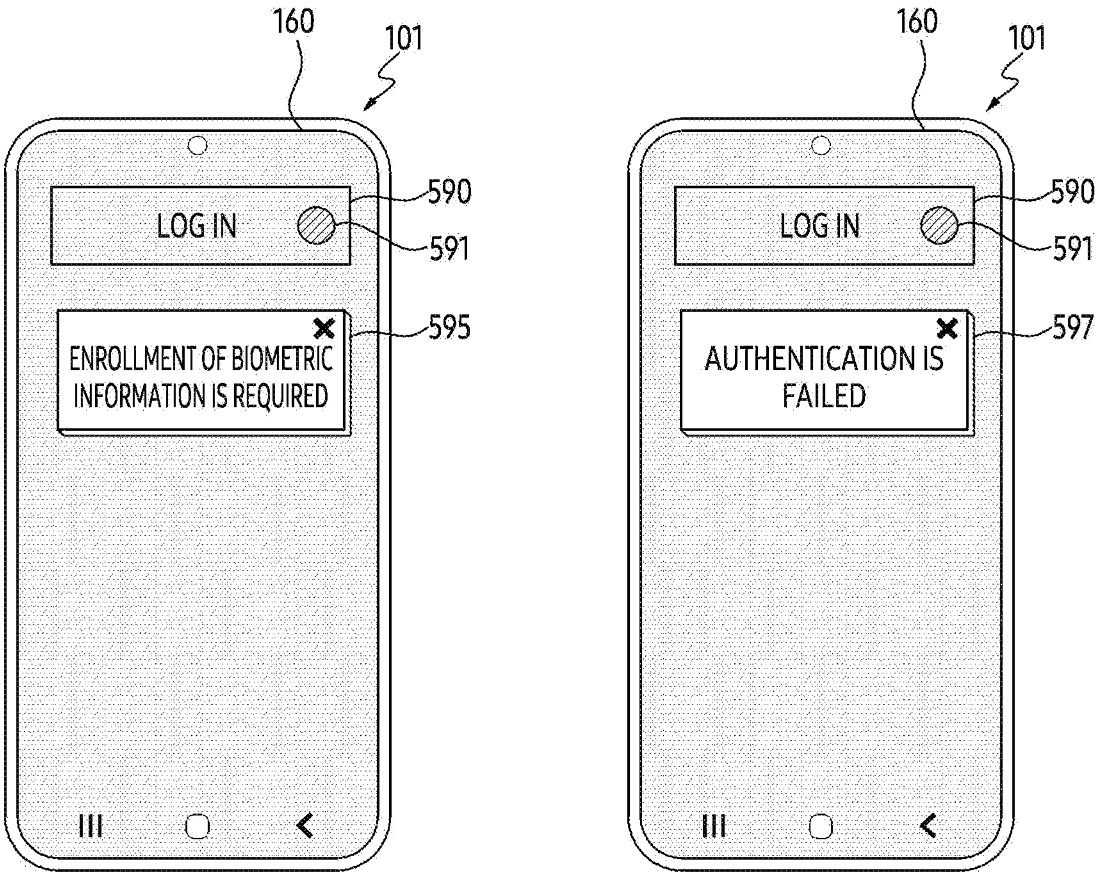
FIG. 5D illustrates a visual object guiding a request for enrollment and failure of authentication according to an embodiment of the disclosure.

FIG. 5D illustrates a visual object guiding a request for enrollment and failure of authentication according to an embodiment of the disclosure. For example, a visual object 595 guiding the request for the enrollment may represent an example of the visual object displayed in operation 535 of FIG. 5B or operation 565 of FIG. 5C. For example, a visual object 597 guiding the failure of the authentication may represent an example of the visual object displayed in operation 580 of FIG. 5C.

Visual objects 595 and 597 of FIG. 5D may be displayed by an electronic device 101 of FIG. 3. For example, the visual objects 595 and 597 may be displayed through a display area of a display (e.g., the display module 160 of FIG. 1) of the electronic device 101.

Referring to FIG. 5D, the electronic device 101 may display a user interface of a specific software application through the display area. For example, the user interface may include a visual object 590 for login. For example, the electronic device 101 may perform the operations of FIG. 5B (e.g., the operations 520 to 540) or the operations of FIG. 5C (e.g., the operations 550 to 585) based on an input 591 for the visual object 590.

According to an embodiment of the disclosure, the electronic device 101 may identify whether a value hashed based on a stored public key and private key exists based on the input 591. For example, based on the input 591, the electronic device 101 may obtain biometric information, obtain feature values, and then identify the existence of stored data (e.g., the value hashed based on the public key and/or the private key). For example, in the example of FIG. 5B, the stored data may include the public key. Alternatively, for example, in the example of FIG. 5C, the stored data may include the value hashed based on the public key and the private key. At this time, the electronic device 101 may display the visual object 595 for notifying that enrollment is required based on identifying that the stored data does not exist. According to an embodiment of the disclosure, the electronic device 101 may display the visual object 595 through the display area in response to identifying that the value hashed based on the public key and private key stored for the biometric information and linked to the user's account for the electronic device 101 does not exist. For example, the visual object 595 may include the text "Enrollment of biometric information is required." According to an embodiment of the disclosure, the visual object 595 may be displayed in a state at least partially overlapping the visual object 590. For example, the visual object 595 may be displayed in a floated state with respect to the visual object 590. However, an embodiment of the disclosure is not limited thereto. For example, the visual object 595 may be displayed in an area different from the area where the visual object 590 is displayed.

According to an embodiment of the disclosure, the electronic device 101 may identify whether the hashed value and the stored value correspond based on the input 591. The converted private key may represent the private key identified in operation 570. The stored value may represent the value hashed based on the private key identified in operation 560. According to an embodiment of the disclosure, the electronic device 101 may display the visual object 597 for notifying that authentication has failed. For example, in a case that the value hashed based on the converted private key and the stored value are different, the electronic device 101 may identify that the authentication has failed. The authentication may be understood as substantially the same as verifying that same data is generated by biometric information on the user's specific body portion (e.g., the biometric information obtained in the operation 500 of FIG. 5A) and other biometric information on the specific body portion (e.g., the biometric information obtained in the operation 550 of FIG. 5C). According to an embodiment of the disclosure, the electronic device 101 may display the visual object 597 through the display area in response to identifying that the authentication has failed. For example, the visual object 597 may include the text "Authentication is failed." According to an embodiment of the disclosure, the visual object 597 may be displayed in a state at least partially overlapping the visual object 590. For example, the visual object 597 may be displayed in the floated state with respect to the visual object 590. However, an embodiment of the disclosure is not limited thereto. For example, the visual object 597 may be displayed in an area different from the area in which the visual object 590 is displayed.

Figure 6:
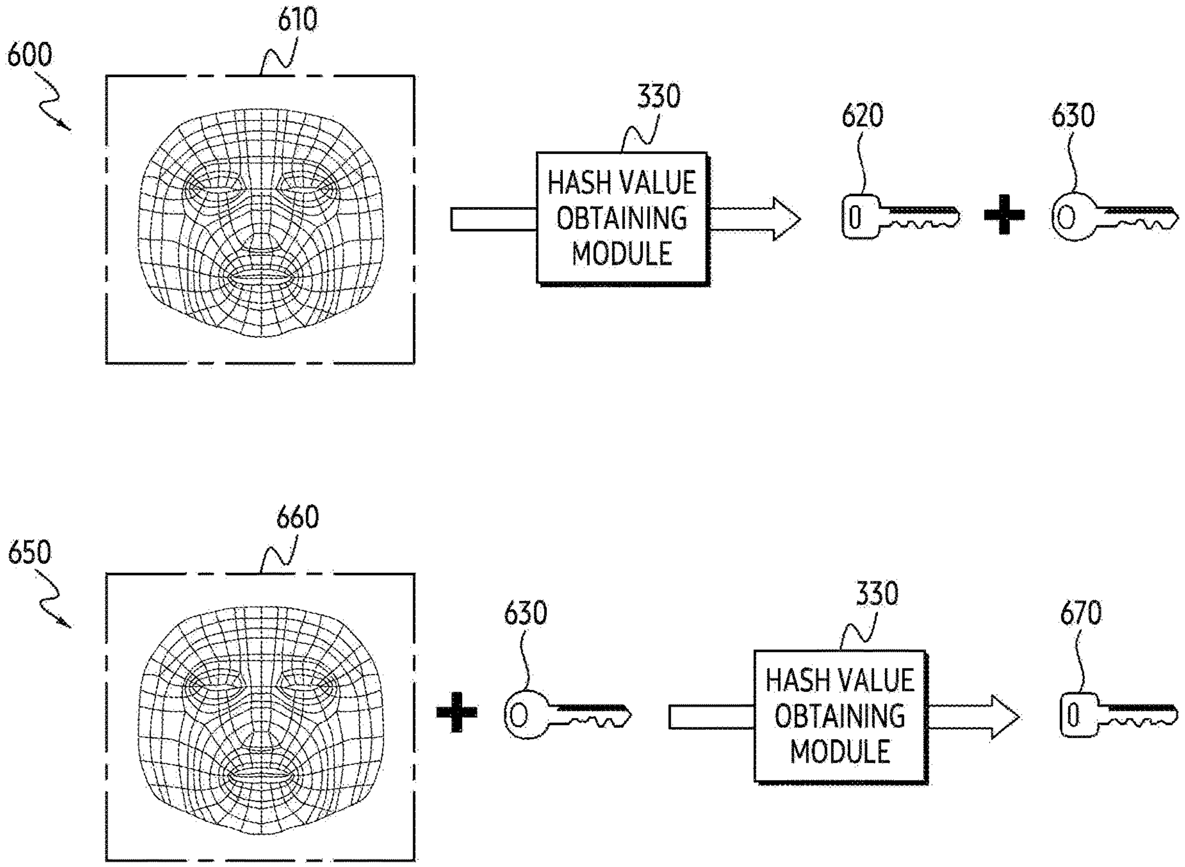
FIG. 6 illustrates a method of enrolling and authenticating a hash value based on biometric information according to an embodiment of the disclosure.

FIG. 6 illustrates a method of enrolling and authenticating a hash value based on biometric information according to an embodiment of the disclosure.

Referring to FIG. 6, it illustrates examples 600 and 650 for a method of performing the enrollment and the authentication based on the obtained biometric information. The example 600 illustrates the method of performing the enrollment by generating a private key 620 and a public key 630 through a biohash algorithm based on biometric information 610. The example 650 illustrates the method of performing the authentication by generating a private key 670 through the biohash algorithm based on biometric information 660 and the enrolled (or stored) public key 630.

Referring to the example 600, the electronic device 101 may obtain the user's biometric information 610. For example, the biometric information 610 may include an image of the user's body portion. For example, the body portion may be the user's face. For example, the electronic device 101 may obtain a plurality of feature values from the biometric information 610. For example, the plurality of feature values may be identified from a landmark of the image for the face. For example, the electronic device 101 may generate the private key 620 and the public key 630 based on the plurality of feature values by using a hash value obtaining module 330. The generated private key 620 and public key 630 may be enrolled (stored). For example, the private key 620 may be stored in memory (e.g., the memory 130 of FIG. 1) in the electronic device 101. The private key 620 may not be made public to the outside of the electronic device 101. In contrast, the value hashed based on the public key 630 and the private key 620 may be stored in an external electronic device (i.e., the second external electronic device) related to an account. For example, the value hashed based on the public key 630 and the private key 620 may be linked to the user's account for the electronic device 101 and may be stored for the body portion (e.g., the face) of the biometric information 610 in the second external electronic device.

Referring to the example 650, the electronic device 101 may obtain user's biometric information 660. For example, the biometric information 660 may include an image of the user's body portion. For example, the body portion may be the user's face. The biometric information 660 is different from the biometric information 610, but may be information on a same body portion (e.g., the face). For example, the electronic device 101 may obtain a plurality of feature values from the biometric information 660. For example, the plurality of feature values may be identified from the landmark of the image for the face. For example, the electronic device 101 may identify whether the public key 630 is stored for the body portion in the second external electronic device. For example, the electronic device 101 may identify that the public key 630 is stored by using the user's account for the electronic device 101. For example, the electronic device 101 may generate a private key 670 based on the plurality of feature values obtained from the biometric information 660 and the public key 630 by using the hash value obtaining module 330. The public key 630 may be a vector for moving the plurality of feature values to coordinates indicated by the private key 670. For example, the electronic device 101 may identify whether the value hashed based on the private key 670 corresponds to the value hashed based on the private key 620 stored in the electronic device 101. For example, in case that the value hashed based on the private key 670 and the value hashed based on the private key 620 correspond, the electronic device 101 may identify a success of authentication. Accordingly, the electronic device 101 may use the value hashed based on the private key 670 for login. Generating the value hashed based on the private key 670 may represent that the authentication for the value hashed based on the private key 670 is successful.

In the examples 600 and 650, the biohash algorithm performed for the plurality of feature values with respect to the entire face is illustrated, but an embodiment of the disclosure is not limited thereto. For example, the biohash algorithm may be performed for feature values with respect to part of the entire face (e.g., the iris, periocular).

Figure 7:
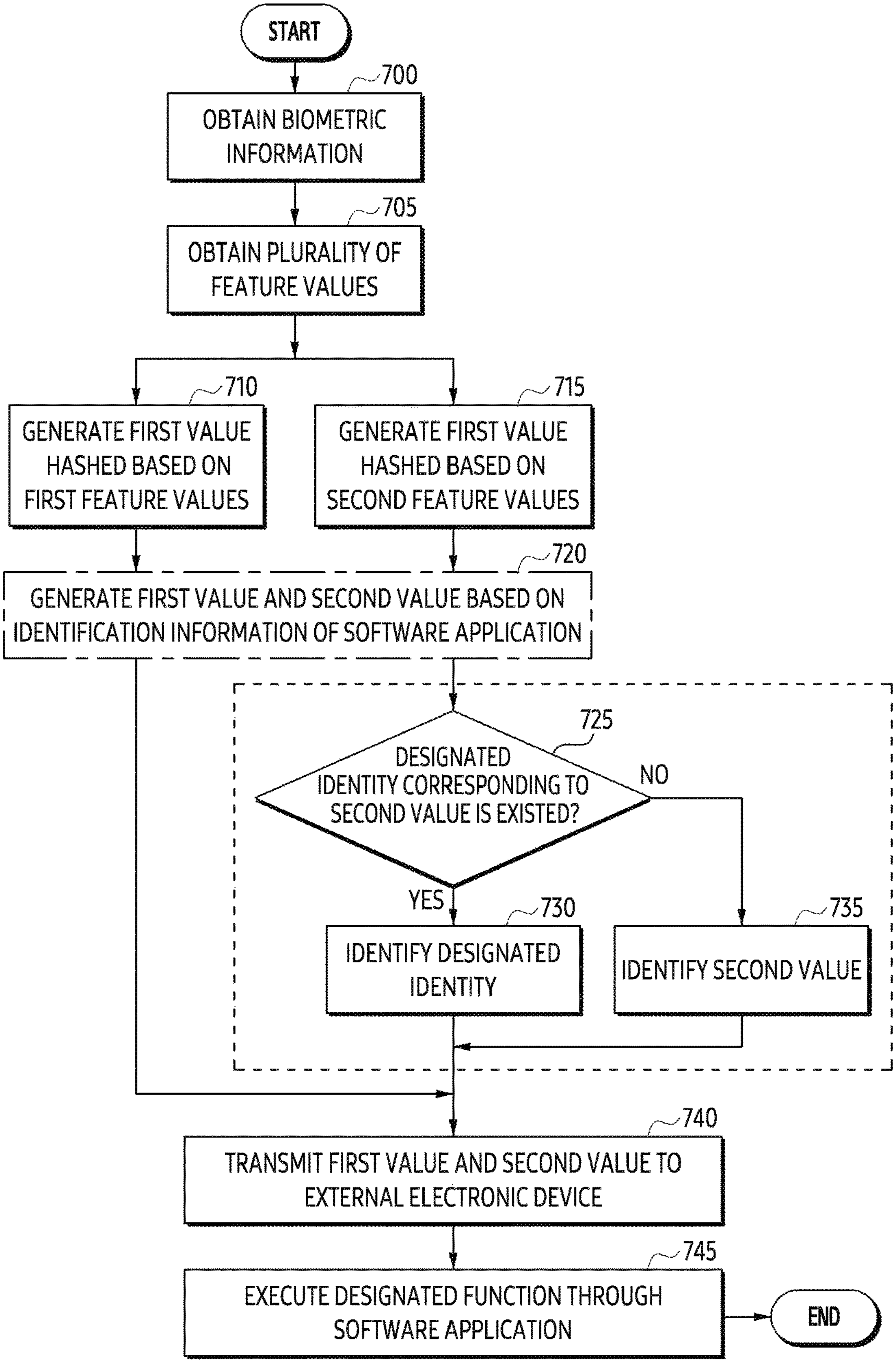
FIG. 7 illustrates an example of an operation flow for a method of authenticating a user based on biometric information with respect to a software application according to an embodiment of the disclosure.

FIG. 7 illustrates an operation flow for a method of authenticating a user based on biometric information with respect to a software application according to an embodiment of the disclosure.

Referring to FIG. 7, the method may be performed by an electronic device 101 of FIG. 3. For example, at least part of the method may be controlled by a processor (e.g., the processor 120 of FIG. 1) included in the electronic device 101. The method of FIG. 7 may be performed after a value (e.g., a first value (e.g., a password) and a second value (e.g., an identity (ID))) for authenticating the user is enrolled (or stored) in a first external electronic device (or a server) for the software application, according to a method of FIG. 4.

Although not illustrated in FIG. 7, in an embodiment of the disclosure, the electronic device 101 may execute the software application. For example, the electronic device 101 may execute the software application based on an input to the software application.

In a following embodiment of the disclosure, each operation may be performed sequentially, but is not necessarily performed sequentially. For example, order of each operation may be changed, and at least two operations may be performed in parallel.

Referring to FIG. 7, in operation 700, the electronic device 101 may obtain biometric information. According to an embodiment of the disclosure, the electronic device 101 may obtain the biometric information on the user's body portion in a state in which the software application is executed. For example, in the above state, the electronic device 101 may obtain an image including the user's body portion through a camera. For example, the image may include a visual object representing the body portion. For example, in the above state, the electronic device 101 may obtain data including the user's body portion through a sensor. For example, the data may include information for identifying feature values according to a shape of the body portion. For example, in the above state, the electronic device 101 may obtain the image through the camera and the data through the sensor together as the biometric information.

In operation 705, the electronic device 101 may obtain a plurality of feature values. According to an embodiment of the disclosure, the electronic device 101 may obtain the plurality of feature values for the body portion associated with the biometric information. For example, the electronic device 101 may obtain the plurality of feature values from the image or the data.

According to an embodiment of the disclosure, the electronic device 101 may identify first feature values from among the plurality of feature values. For example, the electronic device 101 may identify the first feature values representing at least part of the body portion from among the plurality of feature values. In addition, the electronic device 101 may identify second feature values from among the plurality of feature values. For example, the electronic device 101 may identify the second feature values representing at least another part of the body portion from among the plurality of feature values. For example, the at least part of the body portion related to the first feature values may include part or all of the body portion. In other words, the at least part of the body portion may be associated with part or all of the biometric information. For example, the at least another part of the body portion related to the second feature values may include part or all of the body portion. In other words, the at least another part of the body portion may be associated with part or all of the biometric information. In the above-described example, the at least another part of the body portion may be included in the at least part of the body portion. Being included in the at least part of the body portion may represent that the at least another part of the body portion at least partially overlaps the at least part of the body portion. However, an embodiment of the disclosure is not limited thereto. For example, the at least another part of the body portion may be different from the at least part of the body portion. In other words, the at least another part of the body portion may not at least partially overlap with the at least part of the body portion. For example, in case that the body portion is a face, the at least part may be periocular, and the at least another part may be an iris or a retina. In addition, for example, in case that the body portion is the face, the at least part may be the iris, and the at least another part may be the face. In addition, for example, in a case that the body portion is a hand, the at least part may be a fingerprint, and the at least another part may be a palm print or a palm shape.

In operation 710, the electronic device 101 may generate a first value hashed based on the first feature values. For example, the electronic device 101 may generate the first value by performing a biohash algorithm based on the first feature values from among the plurality of feature values. In addition, in operation 715, the electronic device 101 may generate a second value hashed based on the second feature values. For example, the electronic device 101 may generate the second value by performing the biohash algorithm based on the second feature values from among the plurality of feature values. The electronic device 101 may generate values (or authentication information) for user authentication by enrolling (or storing) a public key and a private key generated based on feature values and performing authentication based on the enrolled public key and private key, based on the biohash algorithm. The values for the user authentication may include the first value and the second value. For example, the first value may be used as a password (PW) for the software application. For example, the second value may be used as an identity (ID) for the software application.

In operation 720, the electronic device 101 may generate the first value and the second value based on identification information of the software application. For example, the electronic device 101 may generate the first value hashed based on the first feature values and the identification information. For example, the electronic device 101 may generate the second value hashed based on the second feature values and the identification information. For example, the identification information may include at least one of domain information of the first external electronic device (e.g., the server) for the software application or package information of the software application. For example, the package information may include a package name. The operation 720 may or may not be performed partially. For example, the electronic device 101 may perform the operation 720 for the first value (e.g., the password) generated by the operation 710, and may not perform the operation 720 for the second value (e.g., the ID) generated by the operation 715. In addition, for example, the electronic device 101 may not perform the operation 720 for both the first value and the second value. In other words, the electronic device 101 may selectively perform the operation 720 according to a security degree. For example, the security degree may be set for each software application by the user.

In operation 725, the electronic device 101 may identify whether a designated identity corresponding to the second value exists. That the designated identity corresponds to the second value may represent that the designated identity is mapped to the second value. According to an embodiment of the disclosure, the electronic device 101 may identify whether the designated identity is enrolled (or stored) in the electronic device 101 or a second external electronic device (e.g., the server) related to an account. For example, the electronic device 101 may identify whether the designated identity corresponding to the second value generated by operation 430 of FIG. 4 or generated before operations of FIG. 4 are performed is enrolled in the second external electronic device or the electronic device 101. The designated identity may be enrolled by being linked to the user's account for the electronic device 101. The second external electronic device related to the account may represent an external electronic device (or a server) different from the first external electronic device (or the server) for the software application.

According to an embodiment of the disclosure, the designated identity may represent an identity in a form of a designated string. For example, the designated string may represent a combination of words that make it easy for the user to use an account. For example, the designated string may include an e-mail of the user. For example, the designated string may be generated based on an input of the user.

In the operation 725, in case that the designated identity is stored in the second external electronic device or the electronic device 101, the electronic device 101 may perform operation 730. In the operation 730, the electronic device 101 may identify the designated identity. For example, the electronic device 101 may use the designated identity mapped to the second value instead of the second value as an identity (ID) for the software application.

In the operation 725, in case that the designated identity is not stored in the second external electronic device or the electronic device 101, the electronic device 101 may perform operation 735. In the operation 735, the electronic device 101 may identify the second value. For example, the electronic device 101 may use the second value, which is a hash value, as an identity (ID) to be used for the software application.

Referring to the above, although an example in which the electronic device 101 performs the operations 725 to 735 has been described, the electronic device 101 may not perform the operations 725 to 735. In other words, the electronic device 101 may selectively perform the operations 725 to 735 according to a setting of the software application or a global setting. For example, the electronic device 101 may set whether to use a preferred ID on the setting of the software application. In case that the preferred ID is used, the electronic device 101 may perform the operations 725 to 735. For example, in case that the preferred ID is not used, the electronic device 101 may not perform the operations 725 to 735. In addition, for example, the electronic device 101 may set whether to use the preferred ID based on the biometric information on the global setting. In case that the operations 725 to 735 are not performed, the electronic device 101 may use the second value, which is the hash value, as the identity (ID) to be used for the software application.

In operation 740, the electronic device 101 may transmit the first value and the second value to an external electronic device. For example, the transmission may be performed based on a communication module 190 of FIG. 1. For example, the communication module 190 may be referred to as a communication circuit. The external electronic device may represent the first external electronic device for the software application. According to an embodiment of the disclosure, the electronic device 101 may transmit the first value and the second value to the first external electronic device in order to compare the first value and the second value with values enrolled in the first external electronic device. Each of the first value and the second value may be compared with a value enrolled (or stored) linked to biometric information (or body portion) in the first external electronic device. For example, the first value generated from the first feature values for an iris may be compared with a value stored for the iris in the first external electronic device. For example, the electronic device 101 may identify whether a difference between the first value and the stored value is less than or equal to a reference difference. For example, in a case of the difference is less than or equal to the reference difference, the first value may be identified as corresponding to (or matching) the stored value. In addition, for example, the second value generated from the second feature values for a face may be compared with another value stored for the face in the first external electronic device. For example, the electronic device 101 may identify whether a difference between the second value and the stored another value is less than or equal to the reference difference. For example, in case that the difference is less than or equal to the reference difference, the second value may be identified as corresponding to (or matching) the stored another value.

In operation 745, the electronic device 101 may execute a designated function through the software application. For example, the electronic device 101 may execute the designated function through the software application in response to the first value and the second value corresponding to the values enrolled (or stored) in the first external electronic device. For example, the designated function may be referred to as a service that the user wants to receive through the software application of the electronic device 101 or the operation performed through the software application.

Referring to the above, an example in which the electronic device 101 obtains one biometric information is illustrated, but an embodiment of the disclosure is not limited thereto. For example, the electronic device 101 may obtain first biometric information (e.g., the image) through the camera and second biometric information (e.g., the data) through the sensor in a state that the software application is running. For example, the first biometric information may be used to generate the first value. For example, the second biometric information may be used to generate the second value. Hereinafter, in FIGS. 8A and 8B, examples of a method for obtaining values for user authentication based on biometric information as described above will be illustrated.

Figure 8A:
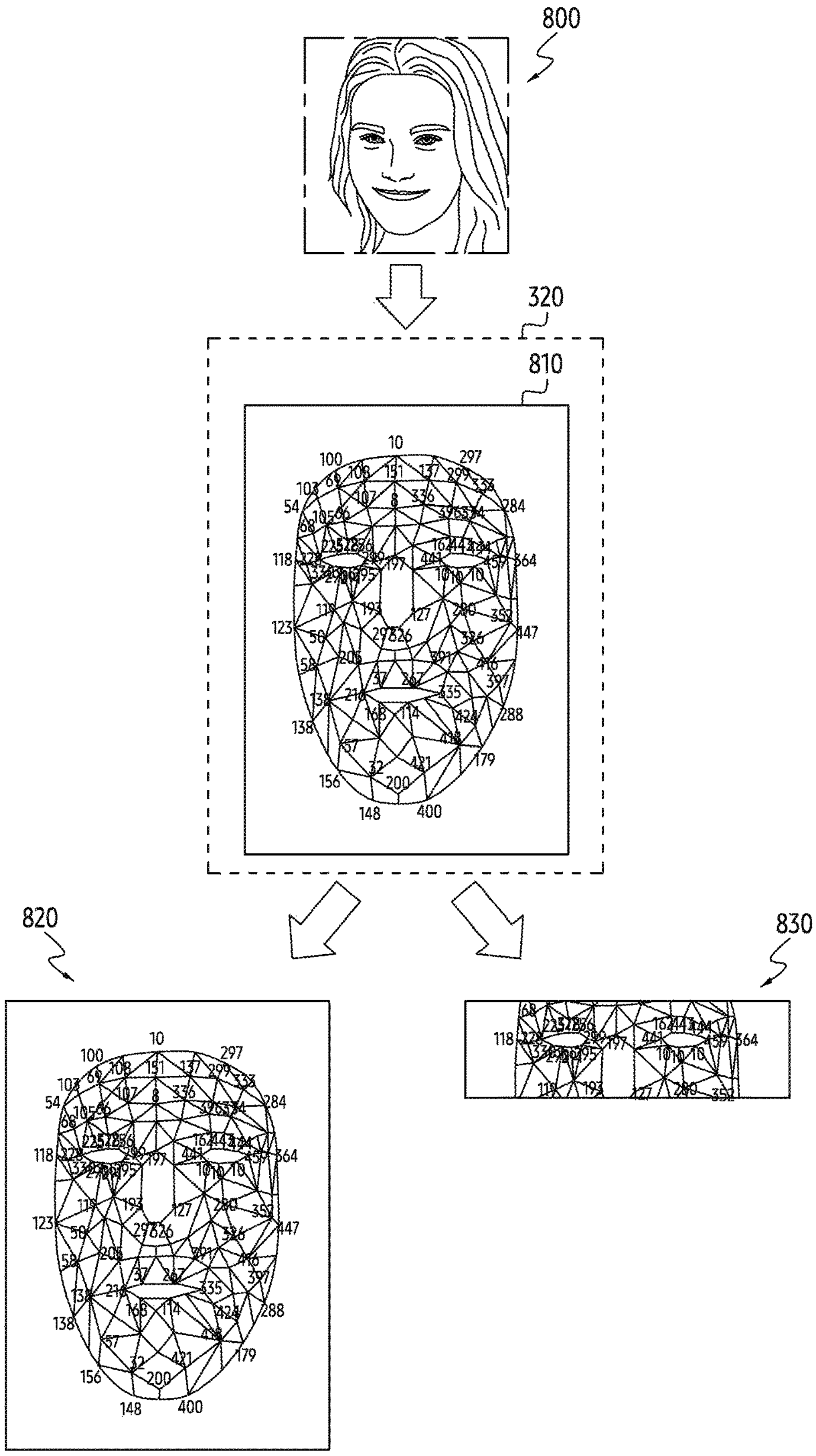
FIGS. 8A and 8B illustrate a method of obtaining a plurality of values for user authentication through one biometric information according to various embodiments of the disclosure.
Figure 8B:
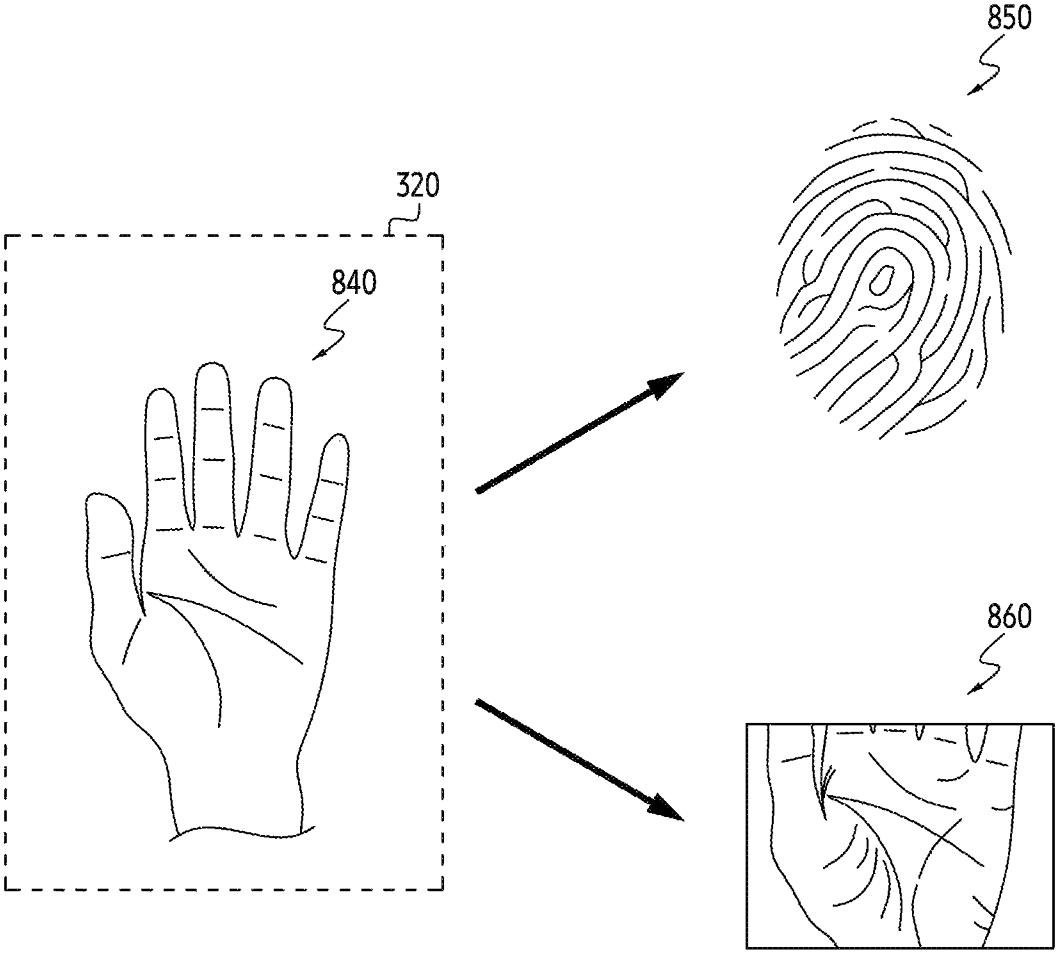

FIGS. 8A and 8B illustrate a method of obtaining a plurality of values for user authentication through one biometric information according to various embodiments of the disclosure.

Referring to FIGS. 8A and 8B, the biometric information may represent information for the user's body portion obtained by an electronic device 101. For example, the electronic device 101 may obtain the biometric information by using a camera (e.g., the camera module 180 of FIG. 1) or a sensor (e.g., the sensor module 176 of FIG. 1). For example, the plurality of values may include a first value (e.g., the PW) and a second value (e.g., the ID), which are authentication information for the user authentication. However, an embodiment of the disclosure is not limited thereto, and the plurality of values may include three or more values. Operations performed based on the following electronic device 101 and components included in the electronic device 101 may be controlled by a processor (e.g., the processor 120 of FIG. 1).

Referring to FIG. 8A, the electronic device 101 may obtain an image 800 for the user by using the camera. For example, the image 800 may include a visual object representing the user's body portion. In an example of FIG. 8A, the image 800 may include a visual object representing the user's face. For example, the image 800 may be referred to as biometric information obtained through the camera.

According to an embodiment of the disclosure, the electronic device 101 may obtain a plurality of feature values 810 based on the image 800. For example, the electronic device 101 may obtain the plurality of feature values 810 based on the biometric information through a feature value obtaining module 320. For example, the plurality of feature values 810 may be associated with the feature values for the face related to the biometric information. For example, the plurality of feature values 810 may be obtained through a landmark obtained from the image 800. For example, the landmark may include 2D coordinate or 3D coordinate. The electronic device 101 may obtain at least part of a set of feature values for each coordinate of the landmark as the plurality of feature values 810.

According to an embodiment of the disclosure, the electronic device 101 may generate a value for the user authentication based on at least part of feature values among the plurality of feature values 810. For example, the electronic device 101 may identify first feature values 820 for the face from among the plurality of feature values 810. In the above-described example, the first feature values 820 may represent all of the plurality of feature values 810. For example, the electronic device 101 may generate the first value based on the first feature values 820. In addition, for example, the electronic device 101 may identify second feature values 830 for periocular among the plurality of feature values 810. For example, the electronic device 101 may generate the second value based on the second feature values 830. The first feature values 820 may be referred to as biometric information for the face. The second feature values 830 may be referred to as biometric information for periocular. For example, the first feature values 820 or the second feature values 830 may be used as biometric information for an iris.

According to an embodiment of the disclosure, the electronic device 101 may generate the first value and the second value based on security of biometric information. For example, the electronic device 101 may generate the first value based on biometric information with high security (e.g., the first feature values 820). In contrast, the electronic device 101 may generate the second value based on biometric information with low security (e.g., the second feature values 830). For example, the security may be identified based on a false acceptance rate (FAR). For example, the FAR may represent a rate at which subjects that should not be permitted are permitted in authentication performed based on biometric information.

Referring to FIG. 8B, the electronic device 101 may obtain data 840 for the user by using the sensor. For example, the data 840 may include information for identifying feature values according to a shape of the user's body portion. In an example of FIG. 8B, the data 840 may include data representing the user's hand. For example, the data 840 may be referred to as biometric information obtained through the sensor.

According to an embodiment of the disclosure, the electronic device 101 may obtain a plurality of feature values based on the data 840. For example, the electronic device 101 may obtain the plurality of feature values based on the data 840 through the feature value obtaining module 320. For example, the plurality of feature values may be associated with the feature values for the hand related to the data 840.

According to an embodiment of the disclosure, the electronic device 101 may generate the value for the user authentication based on at least part of feature values from among the plurality of feature values. For example, the electronic device 101 may identify first feature values 850 for a fingerprint from among the plurality of feature values. In the above-described example, the first feature values 850 may represent feature values for a finger portion from among the plurality of feature values. For example, the electronic device 101 may generate the first value based on the first feature values 850. In addition, for example, the electronic device 101 may identify second feature values 860 for a palm print from among the plurality of feature values. For example, the electronic device 101 may generate the second value based on the second feature values 860. The first feature values 850 may be referred to as biometric information for the fingerprint. The second feature values 860 may be referred to as biometric information for the palm print. However, an embodiment of the disclosure is not limited thereto. For example, the first feature values 850 or the second feature values 860 may be used as biometric information for a palm shape.

According to an embodiment of the disclosure, the electronic device 101 may generate the first value and the second value based on the security of biometric information. For example, the electronic device 101 may generate the first value based on biometric information with high security (e.g., the first feature values 850). Alternatively, the electronic device 101 may generate the second value based on biometric information with low security (e.g., the second feature values 860). For example, the security may be identified based on the false acceptance rate (FAR). For example, the FAR may represent the rate of subjects that should not be permitted are permitted in authentication performed based on biometric information.

Figure 9:
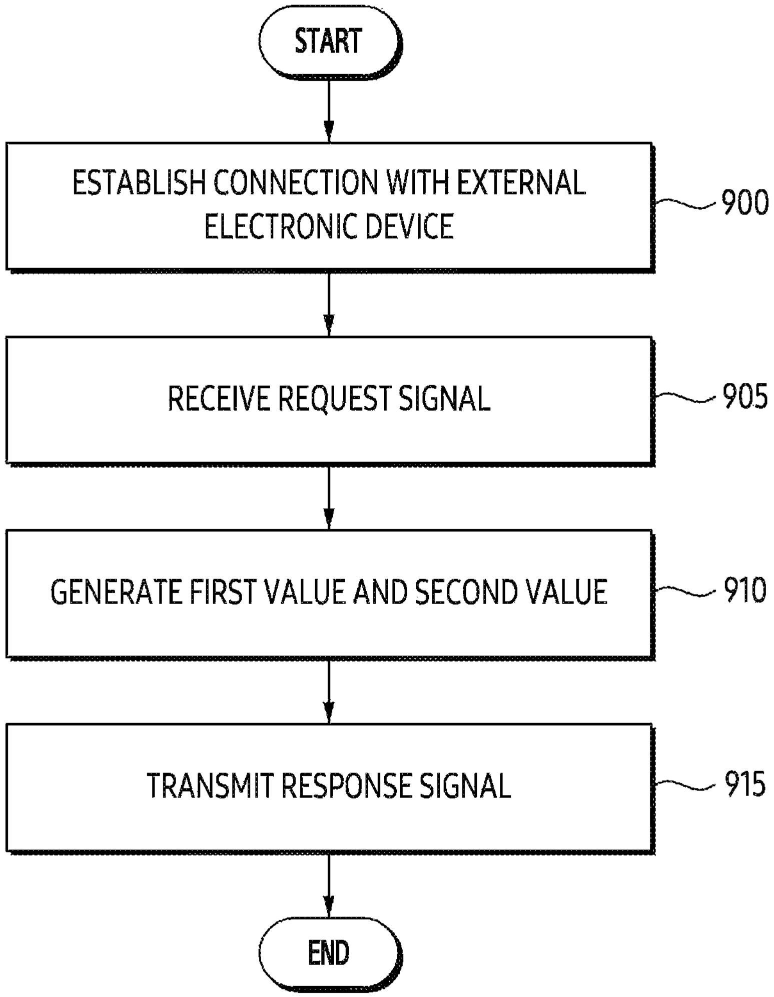
FIG. 9 illustrates an operation flow for a method of performing user authentication in an external electronic device according to an embodiment of the disclosure.

FIG. 9 illustrates an operation flow for a method of performing user authentication in an external electronic device according to an embodiment of the disclosure.

Referring to FIG. 9, the method may be performed by an electronic device 101 of FIG. 3. For example, at least part of the method may be controlled by a processor (e.g., the processor 120 of FIG. 1) included in the electronic device 101. The method of FIG. 9 may be performed after a value (e.g., a first value (e.g., a password) and a second value (e.g., an identity (ID))) for authenticating the user is enrolled (or stored) in a first external electronic device (or a server) for the software application, according to the method of FIG. 4.

The external electronic device may represent an electronic device different from the electronic device 101. The external electronic device may represent an external electronic device different from the first external electronic device for the software application and a second external electronic device related to an account. For example, the external electronic device may be an electronic device that cannot directly perform a biohash algorithm. For example, the external electronic device may be an electronic device (e.g., a television (TV)) that does not include the camera or the sensor. Alternatively, the external electronic device may be an electronic device that is difficult to internally perform the biohash algorithm according to a limited resource. The method of FIG. 9 may represent the method of performing the user authentication by indirectly performing the biohash algorithm through the electronic device 101 since the external electronic device cannot directly perform the biohash algorithm.

In a following embodiment of the disclosure, each operation may be performed sequentially, but is not necessarily performed sequentially. For example, order of each operation may be changed, and at least two operations may be performed in parallel.

Referring to FIG. 9, in operation 900, the electronic device 101 may establish a connection with the external electronic device. For example, the establishment of the connection may be performed based on a communication module 190 of FIG. 1. For example, the communication module 190 may be referred to as a communication circuit. According to an embodiment of the disclosure, the electronic device 101 may be connected with the external electronic device based on a communication network. For example, the communication network may include a wide area network (WAN) or a local area network (LAN). For example, the LAN may include Bluetooth (BT), wireless fidelity (WiFi) (or WiFi direct), or near field communication (NFC). For example, the electronic device 101 may form a secured channel between the electronic device 101 and the external electronic device based on the communication network. For example, the secured channel (or communication channel) may be formed based on authentication applied to the software application installed in each of the electronic device 101 and the external electronic device. The software application may be used to authenticate that the electronic device 101 and the external electronic device are permitted connections by a same user or an authenticated user. However, an embodiment of the disclosure is not limited thereto. For example, the electronic device 101 and the external electronic device may use the secured channel formed based on a different authentication method.

In operation 905, the electronic device 101 may receive a request signal. For example, the electronic device 101 may receive the request signal from the external electronic device based on the secured channel. For example, when connected to the external electronic device through the WAN, the electronic device 101 may receive the request signal based on a push (or a push signal). Alternatively, when connected to the external electronic device through the LAN, the electronic device 101 may directly receive the request signal according to a communication protocol connected to the external electronic device. For example, the request signal may be a signal for the external electronic device to request values (or authentication information) for the user authentication. For example, the values may include the first value (PW) and the second value (ID).

In operation 910, the electronic device 101 may generate the first value and the second value. For example, the electronic device 101 may perform operation 700 to operation 715 (or operation 720) of FIG. 7. For example, the electronic device 101 may obtain biometric information. For example, the electronic device 101 may obtain a plurality of feature values based on the biometric information. For example, the electronic device 101 may generate the first value based on at least part of the plurality of feature values. In addition, the electronic device 101 may generate the second value based on at least another part of the plurality of feature values. Alternatively, the electronic device 101 may generate the first value or the second value further based on identification information of the software application requesting authentication.

In operation 915, the electronic device 101 may transmit a response signal. For example, the electronic device 101 may transmit the response signal, which is a response to the request signal, to the external electronic device. For example, the response signal may be used for authenticating the user with respect to the software application requesting the authentication in the external electronic device. For example, the response signal may include the first value and the second value. For example, when connected to the external electronic device through the WAN, the electronic device 101 may transmit the response signal to the external electronic device based on the account in the second external electronic device (or the server). The account may represent the user's account for a manufacturer of the electronic device 101. Alternatively, when connected to the external electronic device through the LAN, the electronic device 101 may directly transmit the response signal according to the communication protocol connected to the external electronic device.

Although not illustrated in FIG. 9, the external electronic device may transmit the first value and the second value to the first external electronic device (or the server) for the software application. Accordingly, the first external electronic device may perform the user authentication based on the first value and the second value with respect to the external electronic device.

Referring to the above, the external electronic device may obtain authentication information of the user by using the electronic device 101. Accordingly, in case that the external electronic device is unable to perform the biohash algorithm or difficult to obtain biometric information, it may obtain the value for authentication through the electronic device 101 and may perform the authentication based on the obtained value.

Figure 10:
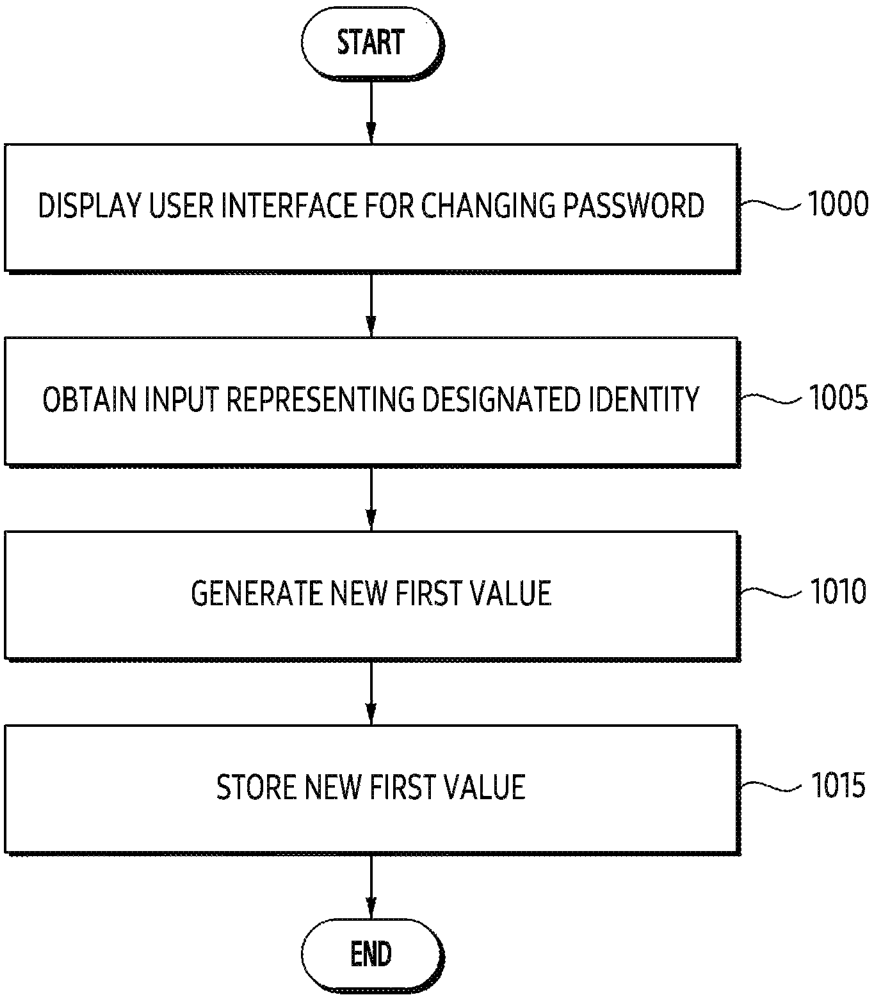
FIG. 10 illustrates an operation flow for a method of changing a value for user authentication according to an embodiment of the disclosure.

FIG. 10 illustrates an operation flow for a method of changing a value for user authentication according to an embodiment of the disclosure.

Referring to FIG. 10, the method may be performed by an electronic device 101 of FIG. 3. For example, at least part of the method may be controlled by a processor (e.g., the processor 120 of FIG. 1) included in the electronic device 101. The method of FIG. 10 may be performed after a value (e.g., a first value (e.g., a password) and a second value (e.g., an identity (ID))) for authenticating the user is enrolled (or stored) in a first external electronic device (or a server) for a software application requesting authentication, according to the method of FIG. 4.

In a following embodiment of the disclosure, each operation may be performed sequentially, but is not necessarily performed sequentially. For example, order of each operation may be changed, and at least two operations may be performed in parallel.

Referring to FIG. 10, in operation 1000, the electronic device 101 may display a user interface (UI) for changing a password. For example, the electronic device 101 may obtain an input for displaying the user interface. In response to identifying the input, the electronic device 101 may display the user interface. For example, the password may represent the first value used for authentication in the software application.

In operation 1005, the electronic device 101 may obtain an input representing a designated identity. For example, the electronic device 101 may obtain the input representing the designated identity for the user interface. The designated identity may be an identity for the software application. For example, the designated identity may have a designated string mapped to the second value used for authentication in the software application. For example, the designated string may be generated based on the user's input. For example, the designated string may represent a combination of words that are easy for the user to use an account. For example, the designated string may include an e-mail of the user.

According to an embodiment of the disclosure, the electronic device 101 may determine whether the user who inputs the designated identity is a user of the electronic device 101. For example, the electronic device 101 may identify whether the user who inputs the designated identity is the user of the electronic device 101 based on a one-time password (OTP). However, an embodiment of the disclosure is not limited thereto, and different authentication methods may be used for the identification.

In operation 1010, the electronic device 101 may generate a new first value. For example, the electronic device 101 may generate the new first value in response to the input for the user interface. For example, in response to the input, the electronic device 101 may identify that a change to the old first value is required. For example, the change to the old first value may be required in case that a shape of the user's body portion is changed. For example, in case that the shape is changed, it may include the change of the body portion due to plastic surgery or the change of the body portion due to aging.

According to an embodiment of the disclosure, the electronic device 101 may generate the new first value in order to change the first value. For example, the electronic device 101 may obtain biometric information for the body portion. For example, the electronic device 101 may obtain a plurality of feature values based on the biometric information. For example, the electronic device 101 may generate the new first value based on at least part of the plurality of feature values. Alternatively, the electronic device 101 may generate the new first value further based on identification information of the software application requesting authentication.

In operation 1015, the electronic device 101 may store the new first value. For example, the electronic device 101 may transmit the new first value to the first external electronic device (or the server) for the software application. Accordingly, the new first value may be stored (or enrolled) in the first external electronic device for the software application.

Referring to the above, the electronic device 101 may change the first value by using the designated string mapped to the second value. In other words, in case that the designated string exists, the user may use a user authentication service according to an embodiment of the disclosure by changing the first value even in a case that the biometric information changes due to aging or an external factor.

Figure 11:
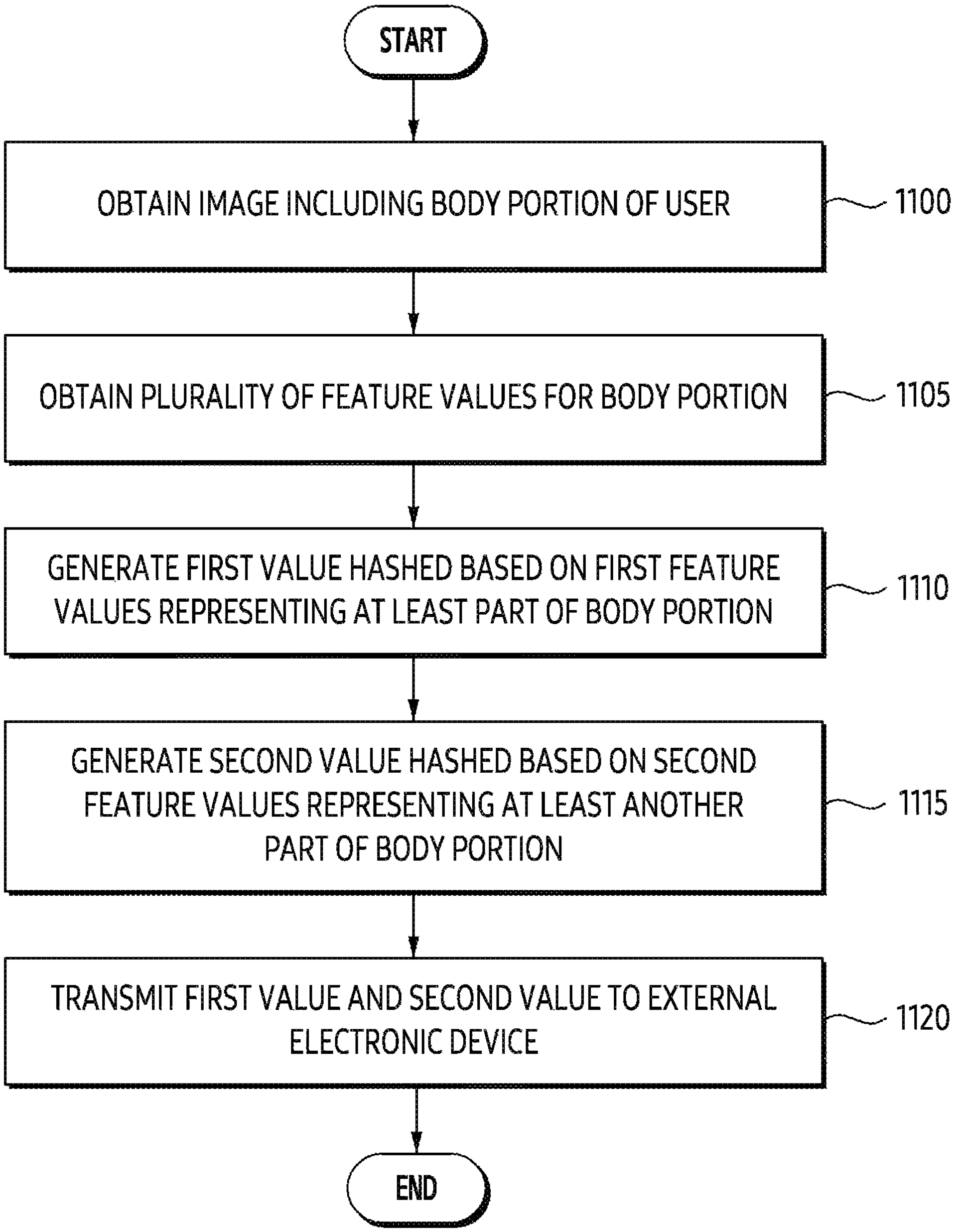
FIG. 11 illustrates an operation flow for a method of obtaining a plurality of values for user authentication from one image according to an embodiment of the disclosure.

FIG. 11 illustrates an operation flow for a method of obtaining a plurality of values for user authentication from one image according to an embodiment of the disclosure.

Referring to FIG. 11, the method may be performed by an electronic device 101 of FIG. 3. For example, at least part of the method may be controlled by a processor (e.g., the processor 120 of FIG. 1) included in the electronic device 101.

Although not illustrated in FIG. 11, in an embodiment of the disclosure, the processor 120 may execute the software application. For example, the processor 120 may execute the software application based on an input to the software application. The software application may represent a software application requesting the user's authentication.

In a following embodiment of the disclosure, each operation may be performed sequentially, but is not necessarily performed sequentially. For example, order of each operation may be changed, and at least two operations may be performed in parallel.

Referring to FIG. 11, in operation 1100, the electronic device 101 may obtain an image including the user's body portion. According to an embodiment of the disclosure, the electronic device 101 may obtain the image, which is the biometric information for the user's body portion, in a state in which the software application is executed. For example, the electronic device 101 may obtain the image through a camera (e.g., the camera module 180 of FIG. 1) in the above state. For example, the image may include a visual object representing the body portion.

However, an embodiment of the disclosure is not limited thereto. For example, the electronic device 101 may obtain data including the user's body portion through a sensor (e.g., the sensor module 176 of FIG. 1) in the above state. For example, the data may include information for identifying feature values according to a shape of the body portion. In addition, for example, the electronic device 101 may obtain the image through the camera and the data through the sensor together as the biometric information in the above state.

In operation 1105, the electronic device 101 may obtain a plurality of feature values. According to an embodiment of the disclosure, the electronic device 101 may obtain the plurality of feature values for the body portion associated with the biometric information. For example, the electronic device 101 may obtain the plurality of feature values from the image. However, an embodiment of the disclosure is not limited thereto. For example, the electronic device 101 may obtain the plurality of feature values based on at least one of the image or the data.

According to an embodiment of the disclosure, the electronic device 101 may identify first feature values from among the plurality of feature values. For example, the electronic device 101 may identify the first feature values representing at least part of the body portion from among the plurality of feature values. In addition, the electronic device 101 may identify second feature values from among the plurality of feature values. For example, the electronic device 101 may identify the second feature values representing at least another part of the body portion from among the plurality of feature values. For example, the at least part of the body portion related to the first feature values may include part or all of the body portion. In other words, the at least part of the body portion may be associated with part or all of the biometric information. For example, the at least another part of the body portion related to the second feature values may include part or all of the body portion. In other words, the at least another part of the body portion may be associated with part or all of the biometric information. For example, in case that the body portion is a face, the at least part may be periocular, and the at least another part may be an iris or a retina. In addition, for example, in case that the body portion is the face, the at least part may be the iris, and the at least another part may be the face. In addition, for example, in a case of the body portion is a hand, the at least part may be a fingerprint, and the at least another part may be a palm print or a palm shape.

In operation 1110, the electronic device 101 may generate a first value hashed based on the first feature values representing at least part of the body portion. For example, the electronic device 101 may generate the first value by performing a biohash algorithm based on the first feature values from among the plurality of feature values. In operation 1115, the electronic device 101 may generate a second value hashed based on the second feature values representing at least another part of the body portion. For example, the electronic device 101 may generate the second value by performing the biohash algorithm based on the second feature values from among the plurality of feature values. The electronic device 101 may generate values for user authentication by enrolling (or storing) a public key and a private key generated based on feature values and performing authentication based on the enrolled public key and private key, based on the biohash algorithm. The values for the user authentication may include the first value and the second value. For example, the first value may be used as a password (PW) for the software application. For example, the second value may be used as an identity (ID) for the software application. Specific details of the biohash algorithm may be understood to be substantially the same as the contents of FIGS. 5A and 6. For example, before operations 1100 to 1115 are performed, the public key and the private key may already be enrolled in the second external electronic device. However, an embodiment of the disclosure is not limited thereto. For example, while operations 1100 to 1115 are performed, the public key and the private key may be re-enrolled (or stored) and authentication may be performed based on the re-enrolled public key and private key. For example, the re-enrollment may be performed in case that the electronic device 101 changes with respect to a same user after service subscription (or enrollment) for a specific software application has already been completed according to the method of FIG. 4.

Although not illustrated in FIG. 11, the electronic device 101 may generate the first value and the second value based on identification information of the software application. For example, the electronic device 101 may generate the first value hashed based on the first feature values and the identification information. For example, the electronic device 101 may generate the second value hashed based on the second feature values and the identification information. For example, the identification information may include at least one of domain information of the first external electronic device (e.g., the server) for the software application or package information of the software application. For example, the package information may include a package name. As described above, the generation of the first value and the second value based on the identification information may or may not be performed partially. For example, the electronic device 101 may perform generation based on the identification information for the first value (e.g., the password) generated by the operation 1110, and may not perform generation based on the identification information for the second value (e.g., the ID) generated by the operation 1115. In addition, for example, the electronic device 101 may not perform generation based on the identification information for both the first value and the second value. In other words, the electronic device 101 may selectively perform generation based on the identification information according to a security degree. For example, the security degree may be set for each software application by the user.

Although not illustrated in FIG. 11, the electronic device 101 may identify whether a designated identity corresponding to the second value exists. Identifying whether the designated identity corresponding to the second value exists may represent that the designated identity is mapped with respect to the second value. According to an embodiment of the disclosure, the electronic device 101 may identify whether the designated identity is enrolled (or stored) in the second external electronic device (e.g., the server) related to an account or the electronic device 101. For example, the second external electronic device may represent a server related to an account for a manufacturer of the electronic device 101. The second external electronic device may represent an external electronic device (or a server) different from the first external electronic device (or the server) for the software application.

According to an embodiment of the disclosure, the designated identity may represent an identity in a form of a designated string. For example, the designated string may represent a combination of words that make it easy for the user to use the account. For example, the designated string may include an e-mail of the user. For example, the designated string may be generated based on the user's input.

According to an embodiment of the disclosure, in case that the designated identity is stored in the second external electronic device or the electronic device 101, the electronic device 101 may use the designated identity instead of the second value as an identity (ID) to be enrolled for the software application.

According to an embodiment of the disclosure, in case that the designated identity is not stored in the second external electronic device or the electronic device 101, the electronic device 101 may generate the designated identity. According to an embodiment of the disclosure, the electronic device 101 may store (or enroll) the designated identity to be mapped to the second value in the second external electronic device. For example, the electronic device 101 may obtain the designated identity based on at least part of the user's input. The electronic device 101 may store the designated identity in the second external electronic device. However, storage of the designated identity may not be performed. For example, the electronic device 101 may use the second value, which is a hash value, as an identity (ID) to be used for the user authentication with respect to the software application.

In operation 1120, the electronic device 101 may transmit the first value and the second value to the external electronic device. For example, the transmission may be performed based on a communication module 190 of FIG. 1. For example, the communication module 190 may be referred to as a communication circuit. The external electronic device may represent the first external electronic device for the software application. According to an embodiment of the disclosure, the electronic device 101 may transmit the first value and the second value to the first external electronic device in order to enroll (or store) the first value and the second value in the first external electronic device. Each of the first value and the second value may be enrolled (or stored) with respect to associated biometric information (or an associated body portion) in the first external electronic device. For example, in case that the first value is generated from the first feature values for the iris, the first value may be enrolled (or stored) in the first external electronic device for the iris. In addition, for example, in case that the second value is generated from the second feature values for the face, the second value may be enrolled (or stored) in the first external electronic device for the face. The enrolled first value and second value may be used for the user authentication.

Although not illustrated in FIG. 11, in an embodiment of the disclosure, the electronic device 101 may re-obtain the biometric information for the body portion after the first value and the second value are enrolled. For example, the electronic device 101 may perform the user authentication based on the re-obtained biometric information. Performing the user authentication may include at least part of the operations according to a method of FIG. 7. According to an embodiment of the disclosure, the electronic device 101 may execute a designated function through the software application as the user authentication is performed.

As described above, the electronic device 101 may obtain biometric information of a user 300 and generate a plurality of values for authenticating the user based on a part and another part (or all) of the obtained biometric information. The plurality of values may be related to the specific software application (e.g., the software application 350). In addition, each of the plurality of values may be related to the user's biometric information (or the associated body portion). For example, a value obtained based on the part of the biometric information may be enrolled (or stored) for the part of the biometric information (or the body portion associated with the part of the biometric information). In addition, for example, a value obtained based on the other part of the biometric information may be enrolled (or stored) for the other part of the biometric information (or the body portion associated with the other part of the biometric information). The electronic device 101 may secure convenience and security by authenticating the user by using the values.

As described above, an electronic device may comprise memory, comprising one or more storage mediums, storing instructions. The electronic device may comprise a camera. The electronic device may comprise a communication circuit. The electronic device may comprise at least one processor comprising processing circuitry. The instructions, when executed by the at least one processor individually or collectively, may cause the electronic device to obtain an image including a body portion of a user through the camera based on execution of a software application. The instructions, when executed by the at least one processor individually or collectively, may cause the electronic device to obtain feature values for the body portion identified based on the image. The instructions, when executed by the at least one processor individually or collectively, may cause the electronic device to generate a first value hashed based on first feature values representing at least one part of the body portion from among the feature values. The instructions, when executed by the at least one processor individually or collectively, may cause the electronic device to generate a second value hashed based on second feature values representing at least another part of the body portion from among the feature values. The instructions, when executed by the at least one processor individually or collectively, may cause the electronic device to transmit, through the communication circuit, the first value and the second value to an external electronic device providing the software application.

According to an embodiment of the disclosure, the first value and the second value may be stored in the external electronic device, to enroll the user for the software application.

According to an embodiment of the disclosure, the instructions, when executed by the at least one processor individually or collectively, may cause the electronic device to obtain another image including the body portion through the camera based on execution of the software application after the first value and the second value based on the image are stored. The instructions, when executed by the at least one processor individually or collectively, may cause the electronic device to obtain feature values based on the another image. The instructions, when executed by the at least one processor individually or collectively, may cause the electronic device to generate the first value hashed based on third feature values representing the at least part of the body portion from among the feature values obtained based on the another image. The instructions, when executed by the at least one processor individually or collectively, may cause the electronic device to generate the second value hashed based on fourth feature values representing the at least another part of the body portion from among the feature values obtained based on the another image. The instructions, when executed by the at least one processor individually or collectively, may cause the electronic device to transmit, to the external electronic device, the first value and the second value based on the another image.

According to an embodiment of the disclosure, the instructions, when executed by the at least one processor individually or collectively, may cause the electronic device to execute a designated function through the software application, based on the first value and the second value based on the image corresponding to the first value and the second value based on the another image.

According to an embodiment of the disclosure, the instructions, when executed by the at least one processor individually or collectively, may cause the electronic device to generate a first private key for generating the first value and a first public key for generating the first private key from the first feature values. The instructions, when executed by the at least one processor individually or collectively, may cause the electronic device to store the first public key with respect to the at least part of the body portion in the electronic device or a server associated with an account of the electronic device. The instructions, when executed by the at least one processor individually or collectively, may cause the electronic device to generate a second private key for generating the second value and a second public key for generating the second private key from the second feature values. The instructions, when executed by the at least one processor individually or collectively, may cause the electronic device to store the second public key with respect to the at least another part of the body portion in the electronic device or the server.

According to an embodiment of the disclosure, the first private key may include information on first coordinates converted from the first feature values based on the first public key to move to the first coordinates. The second private key may include information on second coordinates converted from the second feature values based on the second public key to move to the second coordinates.

According to an embodiment of the disclosure, the instructions, when executed by the at least one processor individually or collectively, may cause the electronic device to obtain the image including the body portion through the camera, based on the execution of the software application after the first public key is stored in the server or the electronic device. The instructions, when executed by the at least one processor individually or collectively, may cause the electronic device to identify the first feature values representing the at least part from among the feature values obtained based on the image. The instructions, when executed by the at least one processor individually or collectively, may cause the electronic device to identify whether a public key stored with respect to the at least part of the body portion is existed. The instructions, when executed by the at least one processor individually or collectively, may cause the electronic device to, in response to identifying the first public key with respect to the at least part in the server, identify a third private key converted from the first feature values based on the first public key.

According to an embodiment of the disclosure, the instructions, when executed by the at least one processor individually or collectively, may cause the electronic device to display, through a screen of the electronic device, a visual object for notifying that an enrollment of the user with respect to the at least part of the body portion is required, in response to identifying that the public key stored with respect to the at least part is not existed in the server or the electronic device.

According to an embodiment of the disclosure, the instructions, when executed by the at least one processor individually or collectively, may cause the electronic device to determine whether the first value hashed based on the first private key corresponds to the first value hashed based on the third private key or not. The instructions, when executed by the at least one processor individually or collectively, may cause the electronic device to, in response to determining that the first value hashed based on the first private key does not correspond to the first value hashed based on the third private key, display, through a screen of the electronic device, a visual object for notifying that authentication of the user is failed.

According to an embodiment of the disclosure, the instructions, when executed by the at least one processor individually or collectively, may cause the electronic device to generate the first value hashed based on the first feature values and identification information of the software application. The first value may represent a password of the user for the software application. The second value may represent an identity (ID) of the user for the software application. The identification information may include at least one from among domain information of the external electronic device providing the software application or package information of the software application.

According to an embodiment of the disclosure, the instructions, when executed by the at least one processor individually or collectively, may cause the electronic device to identify whether a designated ID of the user for the software application, which is mapped to the second value, is existed or not. The instructions, when executed by the at least one processor individually or collectively, may cause the electronic device to, in response to identifying that the designated ID is existed, transmit, to the external electronic device providing the software application, the designated ID instead of the second value, together with the first value.

According to an embodiment of the disclosure, the instructions, when executed by the at least one processor individually or collectively, may cause the electronic device to, in response to identifying that the designated ID is not existed, store the designated ID mapped to the second value in the electronic device or a server associated with an account of the electronic device. The designated ID may be generated based on an input of the user.

According to an embodiment of the disclosure, the body portion may include a face of the user. The at least part of the body portion may include an iris of the face. The at least another part may include the face.

According to an embodiment of the disclosure, the body portion may include a hand of the user. The at least part of the body portion may include a finger print. The at least another part may include a palm print.

According to an embodiment of the disclosure, the instructions, when executed by the at least one processor individually or collectively, may cause the electronic device to receive, from another external electronic device connected to the electronic device, a request signal for the first value and the second value. The instructions, when executed by the at least one processor individually or collectively, may cause the electronic device to, in response to receiving the request signal, transmit, to the another external electronic device, a response signal including the first value and the second value generated based on the image. The response signal may be used to authenticate the user for the software application in the another external electronic device.

As described above, a method performed by an electronic device may comprise obtaining an image including a body portion of a user through the camera based on execution of a software application. The method may comprise obtaining feature values for the body portion identified based on the image. The method may comprise generating a first value hashed based on first feature values representing at least one part of the body portion from among the feature values. The method may comprise generating a second value hashed based on second feature values representing at least another part of the body portion from among the feature values. The method may comprise transmitting, through the communication circuit, the first value and the second value to an external electronic device providing the software application.

As described above, a non-transitory computer-readable storage medium, when individually or collectively executed by at least one processor of an electronic device comprising a camera and a communication circuit, may store one or more programs comprising instructions to cause to obtain an image including a body portion of a user through the camera based on execution of a software application. The non-transitory computer-readable storage medium, when individually or collectively executed by the at least one processor, may store one or more programs comprising instructions to cause to obtain feature values for the body portion identified based on the image. The non-transitory computer-readable storage medium, when individually or collectively executed by the at least one processor, may store one or more programs comprising instructions to cause to generate a first value hashed based on first feature values representing at least one part of the body portion from among the feature values. The non-transitory computer-readable storage medium, when individually or collectively executed by the at least one processor, may store one or more programs comprising instructions to cause to generate a second value hashed based on second feature values representing at least another part of the body portion from among the feature values. The non-transitory computer-readable storage medium, when individually or collectively executed by the at least one processor, may store one or more programs comprising instructions to cause to transmit, through the communication circuit, the first value and the second value to an external electronic device providing the software application.

As described above, an electronic device may comprise memory, comprising one or more storage mediums, storing instructions. The electronic device may comprise a camera. The electronic device may comprise a communication circuit. The electronic device may comprise at least one processor comprising processing circuitry. The instructions, when executed by the at least one processor individually or collectively, may cause the electronic device to obtain biometric information for a body portion of a user through the sensor based on execution of a software application. The biometric information may include at least one of a finger print, a palm print, an iris, a voice, or an image for a face. The instructions, when executed by the at least one processor individually or collectively, may cause the electronic device to generate a first value hashed based on a portion of the biometric information and a second value hashed based on the biometric information. The first value may represent a password of the user for the software application. The second value may represent an identity (ID) for the software application. The instructions, when executed by the at least one processor individually or collectively, may cause the electronic device to transmit, to an external electronic device providing the software application through the communication circuit, the first value and the second value.

According to an embodiment of the disclosure, the instructions, when executed by the at least one processor individually or collectively, may cause the electronic device to generate first feature values representing a part of the body portion based on the portion of the biometric information. The instructions, when executed by the at least one processor individually or collectively, may cause the electronic device to generate second feature values representing the body portion based on the biometric information. The first value may be hashed based on the first feature values. The second value may be hashed based on the second feature values.

According to an embodiment of the disclosure, the first value and the second value may be stored in the external electronic device, to enroll the user for the software application.

According to an embodiment of the disclosure, the instructions, when executed by the at least one processor individually or collectively, may cause the electronic device to obtain another biometric information for the body portion through the sensor based on execution of the software application, after the first value and the second value based on the biometric information are stored. The instructions, when executed by the at least one processor individually or collectively, may cause the electronic device to generate the first value hashed based on a portion of the another biometric information and the second value hashed based on the another biometric information. The instructions, when executed by the at least one processor individually or collectively, may cause the electronic device to transmit, to the external electronic device, the first value and the second value based on the another biometric information.

According to an embodiment of the disclosure, the instructions, when executed by the at least one processor individually or collectively, may cause the electronic device to execute a designated function through the software application, based on the first value and the second value based on the biometric information corresponding to the first value and the second value based on the another biometric information.

As described above, a method performed by an electronic device may comprise obtaining biometric information for a body portion of a user through the sensor based on execution of a software application. The biometric information may include at least one of a finger print, a palm print, an iris, a voice, or an image for a face. The method may comprise generating a first value hashed based on a portion of the biometric information and a second value hashed based on the biometric information. The first value may represent a password of the user for the software application. The second value may represent an identity (ID) for the software application. The method may comprise transmitting, to an external electronic device providing the software application through the communication circuit, the first value and the second value.

As described above, a non-transitory computer-readable storage medium, when individually or collectively executed by at least one processor of an electronic device comprising a sensor and a communication circuit, may store one or more programs comprising instructions to cause to obtain biometric information for a body portion of a user through the sensor based on execution of a software application. The biometric information may include at least one of a finger print, a palm print, an iris, a voice, or an image for a face. The non-transitory computer-readable storage medium, when individually or collectively executed by the at least one processor, may store one or more programs comprising instructions to cause to generate a first value hashed based on a portion of the biometric information and a second value hashed based on the biometric information. The first value may represent a password of the user for the software application. The second value may represent an identity (ID) for the software application. The non-transitory computer-readable storage medium, when individually or collectively executed by the at least one processor, may store one or more programs comprising instructions to cause to transmit, to an external electronic device providing the software application through the communication circuit, the first value and the second value.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as “A or B,” “at least one of A and B,” “at least one of A or B,” “A, B, or C,” “at least one of A, B, and C,” and “at least one of A, B, or C,” may include any one of or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” or “connected with” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

No claim element is to be construed under the provisions of 35 U.S.C. § 112, sixth paragraph, unless the element is expressly recited using the phrase "means for" or "means".

What is claimed is:

1. An electronic device comprising, memory, comprising one or more storage mediums, storing instructions;

a camera;

communication circuitry; and at least one processor comprising processing circuitry, wherein the instructions, when executed by the at least one processor individually or collectively, cause the electronic device to:

obtain an image including a body portion of a user through the camera based on execution of a software application, obtain feature values for the body portion identified based on the image, generate a first value hashed based on first feature values representing at least one part of the body portion from among the feature values, generate a second value hashed based on second feature values representing at least another part of the body portion from among the feature values, transmit, through the communication circuitry, the first value and the second value to an external electronic device providing the software application, generate a first private key for generating the first value and a first public key for generating the first private key from the first feature values, store the first public key with respect to the at least part of the body portion in the electronic device or a server associated with an account of the electronic device, generate a second private key for generating the second value and a second public key for generating the second private key from the second feature values, and store the second public key with respect to the at least another part of the body portion in the electronic device or the server, wherein the first private key includes information on first coordinates converted from the first feature values based on the first public key to move to the first coordinates, and wherein the second private key includes information on second coordinates converted from the second feature values based on the second public key to move to the second coordinates.

2. The electronic device of claim 1, wherein the first value and the second value are stored in the external electronic device, to enroll the user for the software application.

3. The electronic device of claim 2, wherein the instructions, when executed by the at least one processor individually or collectively, cause the electronic device to:

obtain another image including the body portion through the camera based on execution of the software application, after the first value and the second value based on the image are stored, obtain feature values based on the another image, generate the first value hashed based on third feature values representing the at least part of the body portion from among the feature values obtained based on the another image, generate the second value hashed based on fourth feature values representing the at least another part of the body portion from among the feature values obtained based on the another image, and transmit, to the external electronic device, the first value and the second value based on the another image.

4. The electronic device of claim 3, wherein the instructions, when executed by the at least one processor individually or collectively, cause the electronic device to:

execute a designated function through the software application, based on the first value and the second value based on the image corresponding to the first value and the second value based on the another image.

5. The electronic device of claim 1, wherein the instructions, when executed by the at least one processor individually or collectively, cause the electronic device to:

obtain the image including the body portion through the camera, based on the execution of the software application, after the first public key is stored in the server or the electronic device, identify the first feature values representing the at least part from among the feature values obtained based on the image, identify whether a public key stored with respect to at least part of the body portion exists, and in response to identifying the first public key with respect to the at least part, in the electronic device or the server, identify a third private key converted from the first feature values based on the first public key.

6. The electronic device of claim 5, wherein the instructions, when executed by the at least one processor individually or collectively, cause the electronic device to:

determine whether the first value hashed based on the first private key corresponds to the first value hashed based on the third private key or not, and in response to determining that the first value hashed based on the first private key does not correspond to the first value hashed based on the third private key, display, through a screen of the electronic device, a visual object for notifying that authentication of the user is failed.

7. The electronic device of claim 1, wherein the instructions, when executed by the at least one processor individually or collectively, cause the electronic device to:

generate the first value hashed based on the feature values and identification information of the software application, wherein the first value represents a password of the user for the software application, wherein the second value represents an identity (ID) of the user for the software application, and wherein the identification information includes at least one from among domain information of the external electronic device providing the software application or package information of the software application.

8. The electronic device of claim 1, wherein the body portion includes a face of the user, wherein the at least part of the body portion includes an iris of the face, and wherein the at least another part includes the face.

9. The electronic device of claim 1, wherein the instructions, when executed by the at least one processor individually or collectively, cause the electronic device to:

receive, from another external electronic device connected to the electronic device, a request signal for the first value and the second value, and in response to receiving the request signal, transmit, to the another external electronic device, a response signal including the first value and the second value generated based on the image, and wherein the response signal is used to authenticate the user for the software application in the another external electronic device.

10. The electronic device of claim 5, wherein the instructions, when executed by the at least one processor individually or collectively, cause the electronic device to:

display, through a screen of the electronic device, a visual object for notifying that an enrollment of the user with respect to the at least part of the body portion is required, in response to identifying that the public key stored with respect to the at least part does not exist in the electronic device or the server.

11. A method performed by an electronic device with a camera and communication circuitry, the method comprising, obtaining an image including a body portion of a user through the camera based on execution of a software application;

obtaining feature values for the body portion identified based on the image;

generating a first value hashed based on first feature values representing at least one part of the body portion from among the feature values;

generating a second value hashed based on second feature values representing at least another part of the body portion from among the feature values;

transmitting, through the communication circuitry, the first value and the second value to an external electronic device providing the software application;

generating a first private key for generating the first value and a first public key for generating the first private key from the first feature values;

storing the first public key with respect to the at least part of the body portion in the electronic device or a server associated with an account of the electronic device;

generating a second private key for generating the second value and a second public key for generating the second private key from the second feature values; and storing the second public key with respect to the at least another part of the body portion in the electronic device or the server;

wherein the first private key includes information on first coordinates converted from the first feature values based on the first public key to move to the first coordinates, and wherein the second private key includes information on second coordinates converted from the second feature values based on the second public key to move to the second coordinates.

12. The method of claim 11, wherein the first value and the second value are stored in the external electronic device, to enroll the user for the software application.

13. The method of claim 12, further comprising:

obtaining another image including the body portion through the camera based on execution of the software application, after the first value and the second value based on the image are stored;

obtaining feature values based on the another image;

generating the first value hashed based on third feature values representing the at least part of the body portion from among the feature values obtained based on the another image;

generating the second value hashed based on fourth feature values representing the at least another part of the body portion from among the feature values obtained based on the another image; and transmitting, to the external electronic device, the first value and the second value based on the another image.

14. The method of claim 13, further comprising:

executing a designated function through the software application, based on the first value and the second value based on the image corresponding to the first value and the second value based on the another image.

15. The method of claim 11, further comprising:

obtaining the image including the body portion through the camera, based on the execution of the software application, after the first public key is stored in the server or the electronic device;

identifying the first feature values representing the at least part from among the feature values obtained based on the image;

identifying whether a public key stored with respect to at least part of the body portion exists; and in response to identifying the first public key with respect to the at least part, in the electronic device or the server, identifying a third private key converted from the first feature values based on the first public key.

16. One or more non-transitory computer-readable storage mediums storing computer-executable instructions that, when executed by at least one processor of an electronic device with a camera and communication circuitry, cause the electronic device to perform operations, the operations comprising:

obtaining an image including a body portion of a user through the camera based on execution of a software application;

obtaining feature values for the body portion identified based on the image;

generating a first value hashed based on first feature values representing at least one part of the body portion from among the feature values;

generating a second value hashed based on second feature values representing at least another part of the body portion from among the feature values;

transmitting, through the communication circuitry, the first value and the second value to an external electronic device providing the software application;

generating a first private key for generating the first value and a first public key for generating the first private key from the first feature values;

storing the first public key with respect to the at least part of the body portion in the electronic device or a server associated with an account of the electronic device;

generating a second private key for generating the second value and a second public key for generating the second private key from the second feature values;

storing the second public key with respect to the at least another part of the body portion in the electronic device or the server;

wherein the first private key includes information on first coordinates converted from the first feature values based on the first public key to move to the first coordinates, and wherein the second private key includes information on second coordinates converted from the second feature values based on the second public key to move to the second coordinates.

17. The one or more non-transitory computer-readable storage mediums of claim 16, wherein the first value and the second value are stored in the external electronic device, to enroll the user for the software application.

18. The one or more non-transitory computer-readable storage mediums of claim 16, the operations further comprising:

obtaining the image including the body portion through the camera, based on the execution of the software application, after the first public key is stored in the server or the electronic device;

identifying the first feature values representing the at least part from among the feature values obtained based on the image;

identifying whether a public key stored with respect to at least part of the body portion exists; and in response to identifying the first public key with respect to the at least part, in the electronic device or the server, identifying a third private key converted from the first feature values based on the first public key.

* * * * *